(12) United States Patent
Hong et al.

(10) Patent No.: US 10,776,068 B2
(45) Date of Patent: Sep. 15, 2020

(54) DISPLAY DEVICE FOR MULTI-SCREEN MIRRORING OF A FIRST EXTERNAL DEVICE AND A SECOND EXTERNAL DEVICE PAIRED WITH THE FIRST EXTERNAL DEVICE

(71) Applicant: LG ELECTRONICS INC., Seoul (KR)

(72) Inventors: Jihye Hong, Seoul (KR); Woojun Jung, Seoul (KR); Soonbo Han, Seoul (KR); Sangjo Park, Seoul (KR); Hyojin Song, Seoul (KR); Chisoon Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 637 days.

(21) Appl. No.: 15/246,362

(22) Filed: Aug. 24, 2016

(65) Prior Publication Data
US 2017/0060518 A1  Mar. 2, 2017

(30) Foreign Application Priority Data
Sep. 2, 2015 (KR) .................. 10-2015-0124031

(51) Int. Cl.
*G06F 3/14* (2006.01)
*G06F 3/0482* (2013.01)
(Continued)

(52) U.S. Cl.
CPC .......... *G06F 3/1454* (2013.01); *G06F 3/0482* (2013.01); *G06F 3/1423* (2013.01);
(Continued)

(58) Field of Classification Search
CPC ................. G06F 3/1454; G06F 3/1423; G06F 2203/04803
See application file for complete search history.

(56) References Cited

U.S. PATENT DOCUMENTS

2003/0103075 A1* 6/2003 Rosselot ................. H04L 41/22
715/717
2011/0314153 A1* 12/2011 Bathiche ................. H04L 63/08
709/225
(Continued)

FOREIGN PATENT DOCUMENTS

| CN | 103379221 | 10/2013 |
|----|-----------|---------|
| EP | 2624581   | 8/2013  |
| EP | 2704461   | 3/2014  |

OTHER PUBLICATIONS

European Patent Office Application Serial No. 16001857.8, Search Report dated Jan. 5, 2017, 9 pages.
(Continued)

*Primary Examiner* — Abdullah Al Kawsar
*Assistant Examiner* — Kenny Nguyen
(74) *Attorney, Agent, or Firm* — Lee, Hong, Degerman, Kang & Waimey

(57) ABSTRACT

The present invention provides an electronic device and a method for controlling the electronic device. According to the present invention, in case a mirroring connection request is received from a first external device, a second external device paired with the first external device is also made to be mirrored so that a mirroring screen of the first external device and a mirroring screen of the second external device can be displayed together.

15 Claims, 21 Drawing Sheets

(51) Int. Cl.
   *G06F 3/16*    (2006.01)
   *H04L 29/06*   (2006.01)
   *H04W 12/06*   (2009.01)
   *H04W 4/80*    (2018.01)

(52) U.S. Cl.
   CPC .......... *G06F 3/165* (2013.01); *H04L 63/0861* (2013.01); *H04W 12/06* (2013.01); *G06F 2203/04803* (2013.01); *G09G 2370/12* (2013.01); *G09G 2370/16* (2013.01); *H04W 4/80* (2018.02)

(56) References Cited

U.S. PATENT DOCUMENTS

| | | | | |
|---|---|---|---|---|
| 2012/0030594 | A1* | 2/2012 | Yokoyama | G06F 3/1454 715/765 |
| 2013/0278484 | A1* | 10/2013 | Hwang | G06F 3/1423 345/2.3 |
| 2013/0294358 | A1* | 11/2013 | Kim | H04W 72/12 370/329 |
| 2013/0332074 | A1* | 12/2013 | Rhee | G01C 21/00 701/487 |
| 2014/0026068 | A1* | 1/2014 | Park | G06F 3/0482 715/748 |
| 2014/0337790 | A1* | 11/2014 | Kim | G06F 3/0482 715/781 |
| 2014/0363024 | A1* | 12/2014 | Apodaca | H03G 3/02 381/109 |
| 2015/0061972 | A1* | 3/2015 | Seo | G06F 3/0488 345/2.3 |
| 2015/0281769 | A1* | 10/2015 | Chiu | H04N 5/38 348/564 |
| 2016/0162092 | A1* | 6/2016 | Kukimoto | G06F 3/167 345/173 |
| 2016/0162130 | A1* | 6/2016 | Yoon | G06F 3/04842 715/748 |
| 2016/0174277 | A1* | 6/2016 | Yoon | H04W 76/14 370/338 |
| 2016/0188197 | A1* | 6/2016 | Ryu | G06F 3/04883 345/156 |
| 2016/0231872 | A1* | 8/2016 | Tamura | G06F 3/048 |
| 2017/0019473 | A1* | 1/2017 | Venkataraman | H04L 41/22 |

OTHER PUBLICATIONS

State Intellectual Property Office of the People's Republic of China Application Serial No. 201610798543.1, Office Action dated Nov. 27, 2019, 25 pages.

* cited by examiner

DISPLAY DEVICE FOR MULTI-SCREEN MIRRORING OF A FIRST EXTERNAL DEVICE AND A SECOND EXTERNAL DEVICE PAIRED WITH THE FIRST EXTERNAL DEVICE

CROSS-REFERENCE TO RELATED APPLICATIONS

Pursuant to 35 U.S.C. § 119(a), this application claims the benefit of earlier filing date and right of priority to Korean Patent Application No. 10-2015-0124031, filed on Sep. 2, 2015, the contents of which are hereby incorporated by reference herein in its entirety.

BACKGROUND OF THE DISCLOSURE

Field of the Disclosure

The present invention relates to an electronic device displaying a screen of an external device by mirroring and a method for controlling the electronic device.

Background of the Disclosure

A screen mirroring technology is a technique for transmitting an image displayed on a current screen in one device (a source device) to other device (sink device) without any change between two devices having an image display function. For example, by transmitting the image to be displayed on the source device such as a mobile phone or a tablet to the sink device such as a TV or a PC, the screen mirroring technology may refer to a technique for displaying them in the sink device such as the TV.

This screen mirroring technology is conventionally used to output the application (for example, games and web page images) being executed in the terminal having a relatively small screen, such as a mobile terminal on a larger screen and can extend the usability of a mobile terminal.

Therefore, a mobile terminal with the screen mirroring technology such as "Wi-Fi Display" or "Mirroring Airplay" is recently increasing.

SUMMARY OF THE DISCLOSURE

Accordingly, an object of the present invention is to address the above-noted and other problems.

An object of the present invention is to provide an electronic device and a method for controlling the electronic device that provides a user interface that a user can more efficiently control a plurality of devices while the user uses the plurality of devices.

In addition, an object of the present invention is to provide an electronic device and a method for controlling the electronic device that can efficiently control a plurality of devices by mirroring the screen of the plurality of devices to a single large screen.

In addition, an object of the present invention is to provide an electronic device and a method for controlling the electronic device that can efficiently control a plurality of devices by mirroring together a plurality of devices paired with the electronic device through a single mirroring connection.

An object of the present invention is not limited to the above mentioned object of the present invention. In addition, another object of the present invention is apparently understood to those of ordinary skill in the art from the following description.

An electronic device in accordance with an aspect of the present invention comprises a communication unit; a display unit; and a controller configured to receive screen data of a first external device and screen data of a second external device paired with the first external device, respectively, and to display a first mirroring screen corresponding to a screen of the first external device and a second mirroring screen corresponding to a screen of the second external device on the display unit when the controller receives a mirroring connection request from the first external device through the communication unit.

When the controller receives the mirroring connection request, the controller may be configured to display an object corresponding to at least one external device having a pairing history with the first external device on the display unit, and when the controller receives an input for selecting an object corresponding to the second external device paired with the first external device at a point of time of receiving the mirroring connection request, the controller may be configured to display the second mirroring screen on the display unit.

The controller may be configured to divide the display unit into a plurality of regions, and to display the first mirroring screen in a first region, the second mirroring screen in a second region, and the object corresponding to at least one external device having a pairing history with the first external device in a third region.

A ratio of the first region, the second region and the third region may be preset by a user.

The controller may be configured to activate the object corresponding to the second external device at a point of time of receiving the mirroring connection request to be selectable, to display the activated object, to inactivate an object corresponding to a third external device not paired with the first external device and to display the inactivate object in the object corresponding to at least one external device having a pairing history with the first external device.

The screen data of the second external device may include location information of the second external device at a point of time at which the second external device is connected by mirroring, and the controller may be configured to divide the second mirroring screen into a plurality of regions by reflecting the location information, and to respectively display the screen of the second external device in the divided regions at the point of time at which that the second external device is connected by mirroring.

The first mirroring screen may include an execution screen of a first application executed in the first external device, and the second mirroring screen may include an execution screen of a second application executed in the second external device to aid execution of the first application in connection with the first application.

The electronic device may further comprise a reception unit; a region in which the second mirroring screen is displayed further may comprise a broadcast program screen received through the reception unit, and the second mirroring screen may be displayed being overlapped on the broadcast program screen.

The second mirroring screen may include an execution screen of a second application executed in the second external device, and the first mirroring screen may include an execution screen of a first application executed in connection with the second application.

The controller may be configured to display a third mirroring screen corresponding to a third external device which is paired with the first external device and outputs sound of multi-media content being played in the first external device on the display unit, and the third mirroring screen may include a control object for controlling a sound output of the third external device.

When the controller receives an input signal for the first mirroring screen while an application which requires an authentication process is executed through the first mirroring screen, the controller may be configured to control to display an authentication region in the screen of the second external device and to control to display an authentication procedure performed through the authentication region in the second mirroring screen.

The second mirroring screen may include at least one of user's fingerprint information or user's handwriting input through the screen of the second external device.

When the controller receives a mirroring connection request from the first external device while executing a first application in the first external device, in case the first application is not installed in the second external device, the controller may be configured to display at least one recommended application associated with the first application on the display unit, and in case one of the recommended applications is selected, the controller may be configured to install the selected application on the second external device.

When the controller receives a mirroring connection request from the first external device while executing a second application by detecting a gesture input from the second external device, the controller may be configured to recommend and display at least one application that can be executed through the gesture input from among at least one application stored in the first external device on the display unit, and in case one of the at least one application is selected, the controller may be configured to execute the selected application in the first external device.

The controller may be configured to receive the mirroring connection request from the first external device while the first external device is paired with the electronic device through the communication unit.

A method for controlling an electronic device according to another aspect of the present invention comprises receiving a mirroring connection request from a first external device through a communication unit; receiving screen data of the first external device and screen data of a second external device paired with the first external device, respectively; and displaying a first mirroring screen corresponding to a screen of the first external device and a second mirroring screen corresponding to a screen of the second external device on a display unit.

The method may further comprise when receiving the mirroring connection request, displaying an object corresponding to at least one external device having a pairing history with the first external device on the display unit; receiving an input for selecting an object corresponding to the second external device paired with the first external device at a point of time of receiving the mirroring connection request; and displaying the second mirroring screen on the display unit.

The displaying the first mirroring screen and the second mirroring screen on the display unit may include dividing the display unit into a plurality of regions; and displaying the first mirroring screen in a first region, the second mirroring screen in a second region, and an object corresponding to at least one external device having a pairing history with the first external device in a third region.

The mirroring connection request is received from the first external device while the first external device is paired with the electronic device through the communication unit.

The first mirroring screen and the second mirroring screen may include an execution screen of the same applications or an execution screen of applications in connection with each other.

According to a mobile terminal and a method for controlling the mobile terminal according to an embodiment of the present invention, the present invention has the following advantages.

According to an embodiment of the present invention, while a user is using a plurality of devices, it can provide a user interface for more efficiently controlling the plurality of devices.

Furthermore, according to an embodiment of the present invention, the plurality of devices can be efficiently controlled by mirroring the screen of the plurality of devices on a single large screen.

Furthermore, according to an embodiment of the present invention, it can effectively control a plurality of devices by mirroring together the plurality of devices paired with an external device through a single mirroring connection.

Further scope of applicability of the present invention become apparent from the detailed description given hereinafter. However, it should be understood that the detailed description and specific examples, while indicating preferred embodiments of the invention, are given by illustration only, since various changes and modifications within the spirit and scope of the invention become apparent to those skilled in the art from this detailed description.

BRIEF DESCRIPTION OF THE DRAWINGS

The present invention become more fully understood from the detailed description given herein below and the accompanying drawings, which are given by illustration only, and thus are not limitative of the present invention, and wherein.

DETAILED DESCRIPTION OF THE EMBODIMENTS

Description now is given in detail according to exemplary embodiments disclosed herein, with reference to the accompanying drawings. For the sake of brief description with reference to the drawings, the same or equivalent components may be provided with the same reference numbers, and description thereof is not repeated. In general, a suffix such as "module" and "unit" may be used to refer to elements or components. Use of such a suffix herein is merely intended to facilitate description of the specification, and the suffix itself is not intended to give any special meaning or function. In the present invention, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

It is understood that although the terms first, second, etc. may be used herein to describe various elements, these elements should not be limited by these terms. These terms are generally only used to distinguish one element from another.

It is understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description is made with reference to particular types of mobile terminals. However, such teachings apply equally to other types of terminals, such as those types noted above. In addition, these teachings may also be applied to stationary terminals such as digital TV, desktop computers, and the like.

Figure 1:
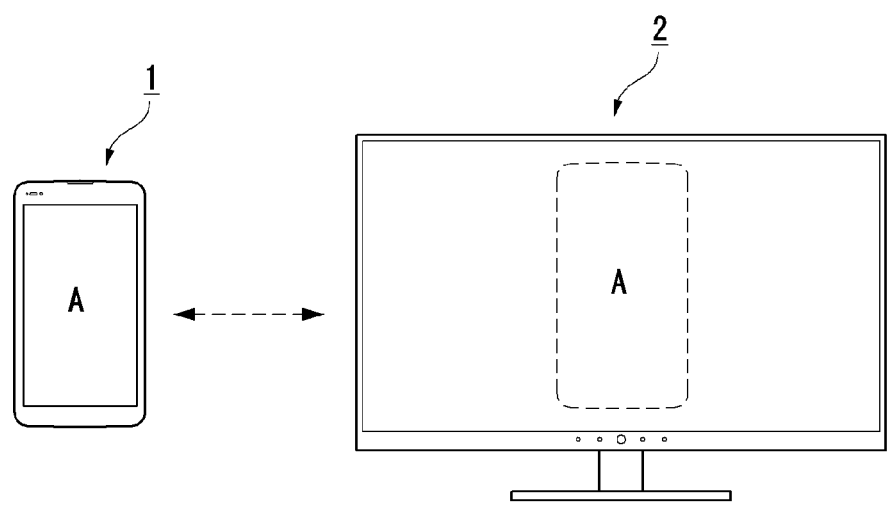
FIG. 1 is a diagram for illustrating schematically an example in which an external device is connected to an electronic device by mirroring according to an embodiment of the present invention.

FIG. 1 is a diagram for illustrating schematically an example in which an external device is connected to an electronic device by mirroring according to an embodiment of the present invention.

Referring to FIG. 1, a mobile terminal 1 may be connected to a display device 2 by mirroring. As mirroring connection technology is wireless display transmission technology, the mirroring connection technology disclosed in this document can display a screen displayed in the mobile terminal 1 on a screen of the display device 2 at the same time as reflect the screen displayed in the mobile terminal 1 in a mirror. Accordingly, pixel information of an original screen of the mobile terminal 1 is sent by wireless without any change.

The mirroring connection may be made in a wired manner such as D-sub (RGB), DVI (Digital Visual Interface), HDMI (High Definition Multimedia Interface), DP (Display Port) and the like. The mirroring connection, however, may directly mirror the screen of the mobile terminal 1 to the display device 2 without an access point through a Wi-Fi Direct technology between the mobile terminal 1 and the display device 2. In addition, for example, the mirroring connection may be performed between the mobile terminal 1 and the display device 2 via a Wi-Fi Miracast method that is wireless video transmission standard created by the Wi-Fi Association.

The mirroring connection disclosed in this document is different from the casting method of transmitting content without directly transmitting the screen of the mobile terminal 1. The casting method may reproduce content by casting typically a URL address with a Wi-Fi Direct way as a way to show in the display device 2 by sending a video signal of the content in the mobile terminal 1 or by transmitting content files to the remote device (the display device 2) as streaming. The mirroring connection disclosed in this document may mean to show the screen of the mobile terminal 1 in the display device 2 without any change unlike the casting connection.

Figure 2:
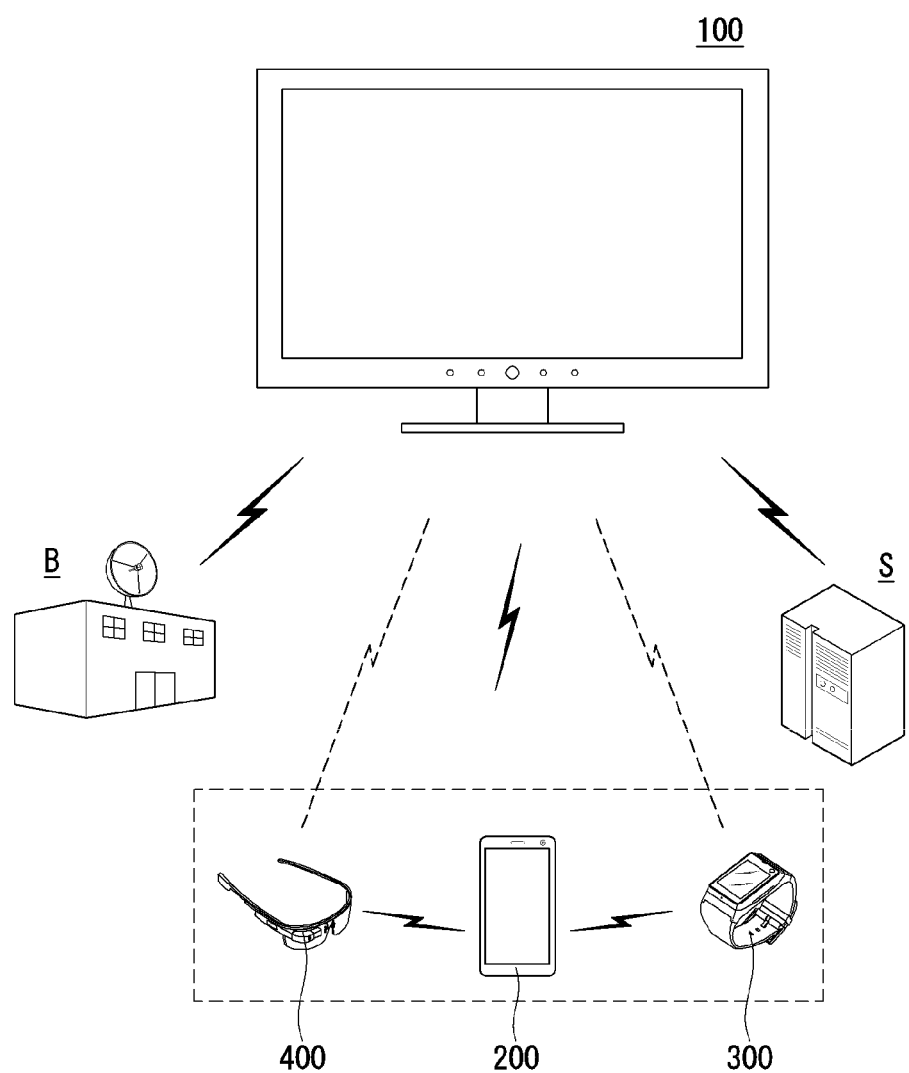
FIG. 2 is a diagram for illustrating an environment in which a method for controlling an electronic device is implemented according to an embodiment of the present invention.

FIG. 2 is a diagram for illustrating an environment in which a method for controlling an electronic device is implemented according to an embodiment of the present invention.

Referring to FIG. 2, environment in which the method for controlling the electronic device is implemented according to an embodiment of the present invention may include an electronic device 100, a broadcasting station B, a server S, and mobile terminals 200, 300, and 400.

The electronic device 100 may refer to a fixed electronic device such as a TV, a PC, and a digital signage device as a device capable of receiving broadcast content. Meanwhile, the TV may include an IPTV (Internet Protocol Television) and a DTV (Digital Television), etc.

The broadcasting station B may transmit a broadcast signal including the broadcast content. The electronic device 100 may receive the broadcast from the broadcasting station B, and receive the broadcast via a predetermined server (not shown).

The electronic device 100 may communicate with the server S. The server S may include a network server. The server S may be a device capable of transmitting and receiving signals with the electronic device 100 over an arbitrary network. For example, the server S may include a mobile terminal that can be connected to the electronic device 100 through a wired or wireless base station. In addition, the server S may include a device capable of providing the content for the electronic device 100 over an internet network. A broadcast content provider may provide the content for the electronic device 100 by using the server S. In addition, the server S is a device that can provide a variety of web service and other information for the electronic device 100 over the internet network.

The mobile terminals 200, 300, and 400 are external devices that can be paired with the electronic device 100. Each of the external devices may request a mirroring connection from the electronic device 100 in the state of being paired with the electronic device 100. The electronic device 100 may perform a mirroring connection with external devices in response to the mirroring connection request of the external device.

According to an embodiment of the present invention, a first external device 200 of the external devices may be paired with a second external device 300 (a watch-type mobile terminal) and/or a third external device 400 (a glass type mobile terminal). The pairing connection can be performed through a short-range communication method. Connection of devices according to the short-range communication method may be implemented using at least one of the technologies of Bluetooth (Bluetooth™) RFID (Radio Frequency Identification), infrared communication (Infrared Data Association; IrDA), UWB (Ultra Wideband), ZigBee, NFC (Near Field Communication), Wi-Fi (Wireless-Fidelity), Wi-Fi Direct, Wireless USB (Wireless Universal Serial Bus) as described above.

The method for controlling an electronic device 100 according to an embodiment of the present invention is characterized in that the second external device 300 and the third external device 400 paired with the first external device 200 are connected to the electronic device 100 by mirroring when the first external device 200 requests the mirroring connection from the electronic device 100 in the state at least two of the external devices 200, 300, and 400 are paired with each other.

Figure 3:
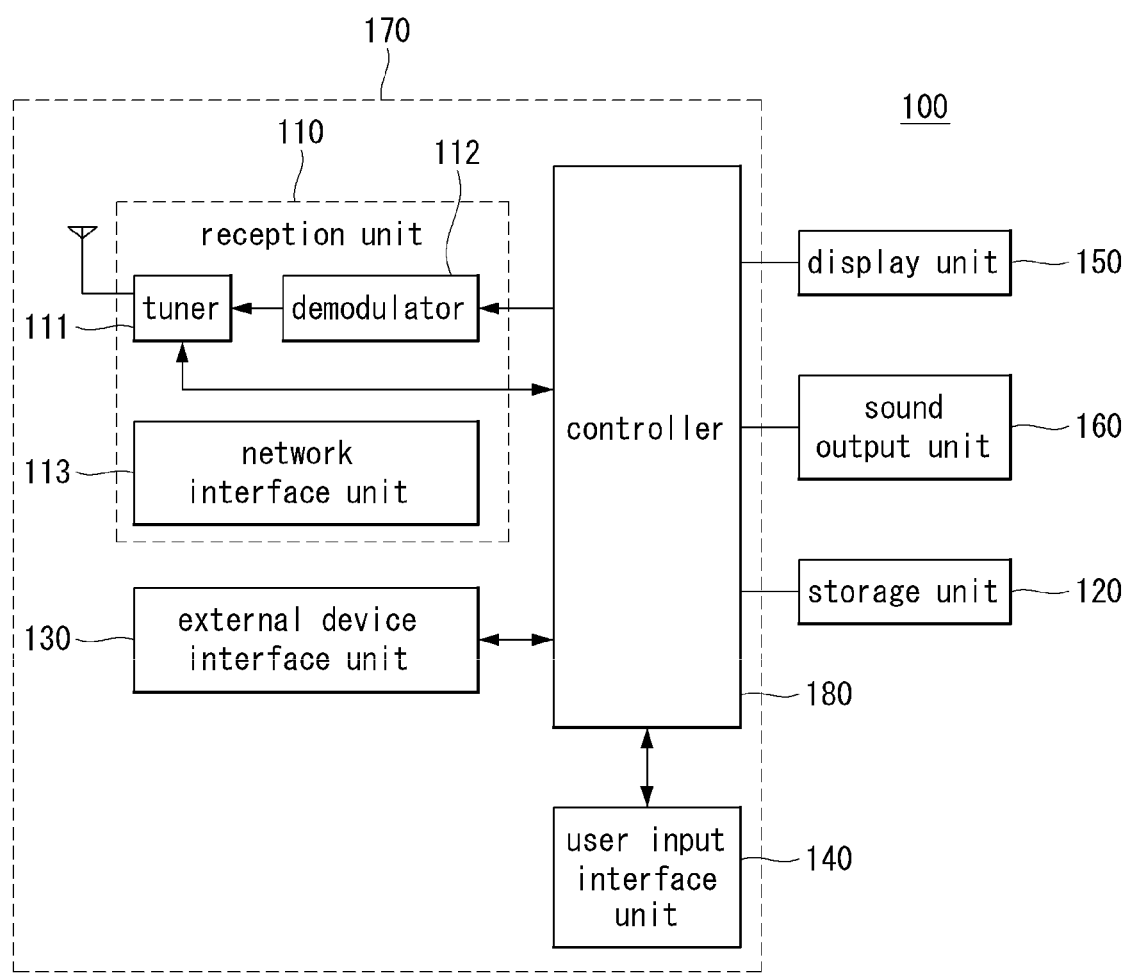
FIG. 3 is a block diagram of an electronic device according to an embodiment of the present invention.

FIG. 3 is a block diagram of an electronic device according to an embodiment of the present invention.

With reference to FIG. 3, a display device 100 according to one embodiment of the present invention comprises a display unit 150 displaying an image and a driving unit 170 providing a driving signal to the display unit 150 in accordance with a received broadcast signal.

The display unit 150 may be called a display panel.

The driving unit 170 can control a video display and an audio output of the display device 100. The driving unit 170 can comprise a reception unit 110, an external device interface unit 130, a storage unit 120, a user input interface unit 140, a controller 180, and a command input unit 150.

The driving unit 170 and the display unit 150 can be built into a single body. Also, the driving unit 170 and the display unit 150 can be modularized separately and perform communication in a wired or wireless manner.

Furthermore, the display device 100 according to the present invention can comprise a sound output unit 160 for outputting a sound.

Furthermore, the display device 100 according to the present invention can comprise a sound output unit 172 for outputting a sound, a sound sensing unit 173 for sensing a sound, and a motion sensing unit 174 for sensing a user's motion.

The broadcast reception unit 110 comprises a tuner 111, a demodulator 112, and a network interface unit 113. Depending on the needs, it is possible to design not to include the network interface unit 113 while incorporating the tuner 111 and the demodulator 112. On the contrary, it is equally possible to design not to include the tuner 111 and the demodulator 112 while incorporating the network interface unit 113.

The tuner 111 can select a Radio Frequency (RF) broadcast signal corresponding to the channel selected by the user from among RF broadcast signals received through an antenna or corresponding to all of the pre-stored channels. Also, the tuner 111 converts the selected RF broadcast signal into an intermediate frequency signal, a base band image, or an audio signal.

For example, if the selected RF broadcast signal is a digital broadcast signal, the tuner 111 converts the RF broadcast signal into a digital IF signal (DIF); if the selected RF broadcast signal is an analog broadcast signal, the tuner 111 can convert the RF broadcast signal into an analog baseband video or an audio signal (CVBS/SIF). In other words, the tuner 111 can process both of the digital broadcast signal or the analog broadcast signal. The analog baseband video or the audio signal (CVBS/SIF) output from the tuner 111 can be fed directly into the controller 180.

The demodulator 112 can perform a demodulation operation by receiving a digital IF signal (DIF) converted in the tuner 111. For example, in case the digital IF signal output from the tuner 111 follows the ATSC scheme, the demodulator 112 can perform, for example, 8-VSB (8-Vestigal Side Band) demodulation. Also, the demodulator 112 can carry out channel demodulation. For this purpose, the demodulator 112 can be equipped with a Trellis decoder, de-interleaver, and Reed Solomon decoder to carry out Trellis decoding, de-interleaving, and Reed Solomon decoding.

The controller 160 outputs a video on the display unit 150 after carrying out inverse-multiplexing, video/audio signal processing and outputs the audio through the sound output unit 160.

The external device interface unit 130 can connect an external device to the display device 100 according to the present invention. To this end, the external device interface unit 130 can include an A/V input output unit (not shown) or a wireless communication unit (not shown). The external device interface unit 130 can be connected to an external device such as Digital Versatile Disk (DVD), Blu-ray, game device, camcorder, and computer in a wired or wireless manner. The external device interface unit 135 can deliver a video, audio, or data signal input from the outside through a connected external device to the controller 160 of the display device 100.

The network interface unit 113 can provide an interface for connecting the display device 100 to a wired or wireless network including the Internet network. The network interface unit 113 can be equipped with an Ethernet port for connection to a wired network, and for connection to a wireless network, the network interface unit 113 may employ Wireless LAN (WLAN or Wi-Fi), Wireless broadband (Wibro), World Interoperability for Microwave Access (Wimax), or High Speed Downlink Packet Access (HSDPA) communication specifications.

The network interface unit 113 can transmit or receive data to and from another user or another electronic device through a connected network or another network linked to the connected network.

Meanwhile, the network interface unit 113 can access a predefined web page through a connected network or another network linked to the connected network. In other words, the network interface unit 113 can transmit or receive data to and from the corresponding server by accessing the predefined web page through a network. Besides, the network interface unit 113 can receive content or data provided by a content provider or a network operator. In other words, the network interface unit 113 can receive content such as movie, advertisement, game, VOD, and broadcast signals; and information related to the content provided by a content provider or a network operator through the network. Also, the network interface unit 113 can receive update information and a update file provided by a network operator. Moreover, the network interface unit 113 can transmit data to an Internet service provider, content provider, or network operator.

The storage unit 120 may store a program intended for processing and controlling various signals within the controller 160 or store video, audio, or data signals processed.

Also, the storage unit 120 may carry out a function for temporarily storing video, audio, or data signals input from the external device interface unit 130 or the network interface unit 113. Also, the storage unit 120 can store information about a predefined broadcast channel through a channel memory function.

The storage unit 120 can include at least one type of storage medium from among flash memory type, hard disk type, multimedia card micro type, card type memory (for example, SD or XD memory), RAM, and ROM (EEPROM and the like).

The display device 100 can play a content file stored in the storage unit 120 (for example, a video file, a still image file, a music file, a document file, an application file, and so on) and provide the content to the user.

Although FIG. 3 assumes the case where the storage unit 120 and controller 160 are installed separately from each other, the storage unit 120 can be incorporated into the controller 180.

The user input interface unit 140 can be an interface with Remote Controller for inputting a command to the electronic device 100. The user input interface unit 140 can receive various commands including power on/off, channel selection, screen setting, volume control, cursor movement on a screen, menu selection, and so on.

In case the user inputs a predetermined command through a wired input unit, the input command may be delivered directly to the controller 180 without passing through the user input interface unit 140. The user input interface unit 140 may receive and process a command coming from a wireless input unit according to various communication methods such as RF communication and infrared (IR) communication or process the control signal from the controller 180 to be transmitted to the wireless input unit.

Also, the controller 180 can control the display device 100 by using a user command input through the user input interface unit 140 or an internal program. In particular, the controller 180 can connect to a network and download an application or an application list that the user wants into the display device 100.

The controller 180 can control playing of content. In this case, content may refer to the content stored in the display device 100, received broadcast content, or content received from the outside. Content may be at least one form of a broadcast video, externally input video, audio file, still image, connected web screen, and document file.

Also, the controller 160 searches for a user terminal connected to the display device through the network interface unit 113, outputs a list of the searched user terminals through the display unit 171, and through the user input interface unit 140, receives a selection signal of the user terminal used as a user controller from among the list of the searched user terminals.

In addition, the controller 180 controls the display unit 150 so that player information corresponding to each user terminal can be displayed through the display unit 150. The display unit 150 can convert a video signal, data signal, and OSD signal processed by the controller 180 or a video signal and data signal received from the external device interface unit 130 into R, G, B signal respectively, thereby generating a driving signal. The display unit 150 can be implemented in the form of PDP, LCD, OLED, flexible display, or 3D display.

Meanwhile the display unit 150 can be made of a touch screen so that it can be used as an input device as well as an output device.

The sound output unit 160 receives a signal processed by the controller 180, for example, a stereo signal, 3.1 channel signal, or 5.1 channel signal and outputs the received signal as a sound. The sound output unit 160 can be implemented in various forms of speakers.

Figure 4:
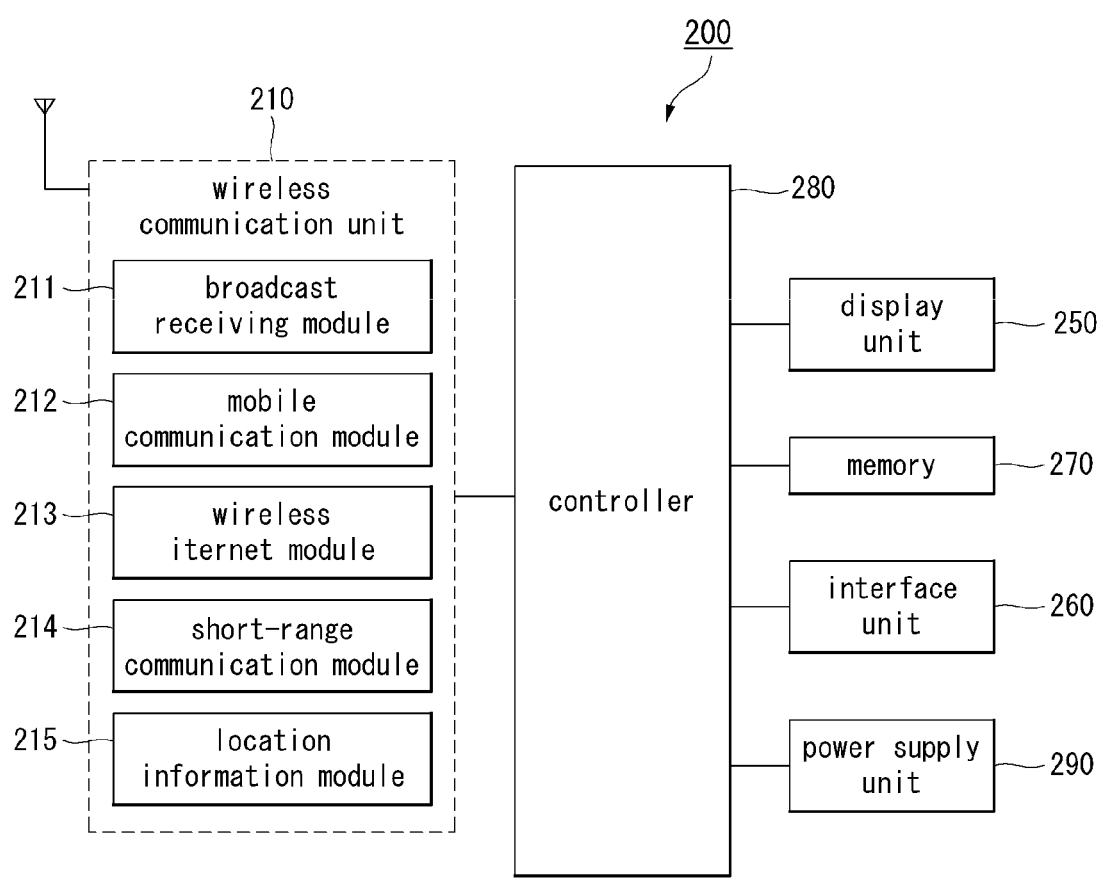
FIG. 4 is a block diagram of an operable mobile terminal by being paired with an electronic device according to an embodiment of the present invention.

FIG. 4 is a block diagram of an operable mobile terminal by being paired with an electronic device according to an embodiment of the present invention.

In other words, it is described on the assumption that a first external device which requests the mirroring connection from the electronic device 100 is the mobile terminal in this document.

The mobile terminal 200 is shown having components such as a wireless communication unit 210, an output unit 250, an interface unit 260, a controller 280, and a power supply unit 290. It is understood that implementing all of the illustrated components is not a requirement, and that greater or fewer components may alternatively be implemented.

The wireless communication unit 210 typically includes one or more modules which permit communications such as wireless communications between the mobile terminal 200 and a wireless communication system, communications between the mobile terminal 200 and another mobile terminal (for example, 300), communications between the mobile terminal 200 and an external server. Further, the wireless communication unit 210 typically includes one or more modules which connect the mobile terminal 200 to one or more networks.

To facilitate such communications, the wireless communication unit 210 includes one or more of a broadcast receiving module 211, a mobile communication module 212, a wireless Internet module 213, a short-range communication module 214, and a location information module 215.

Referring still to FIG. 4, various components depicted in this figure now is described in more detail. Regarding the wireless communication unit 210, the broadcast receiving module 211 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 211 may be utilized to facilitate simultaneously receiving of two or more broadcast channels, or to support switching among broadcast channels.

The mobile communication module 212 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 212 include audio call signals, video (telephony) call signals, or various formats of data to support communication of text and multimedia messages.

The wireless Internet module 213 is configured to facilitate wireless Internet access. This module may be internally or externally coupled to the mobile terminal 200. The wireless Internet module 213 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 213 performs such wireless Internet access. As such, the Internet module 213 may cooperate with, or function as, the mobile communication module 212.

The short-range communication module 214 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 214 in general supports wireless communications between the mobile terminal 200 and a wireless communication system, communications between the mobile terminal 200 and another mobile terminal 200, or communications between the mobile terminal and a network where another mobile terminal 200 (or an external server) is located, via wireless area networks. One example of the wireless area networks is a wireless personal area networks.

In some embodiments, another mobile terminal (which may be configured similarly to mobile terminal 200) may be a wearable device, for example, a smart-watch, a smart glass or a head mounted display (HMD), which is able to exchange data with the mobile terminal 200 (or otherwise cooperate with the mobile terminal 200). The short-range communication module 214 may sense or recognize the wearable device, and permit communication between the wearable device and the mobile terminal 200. In addition, when the sensed wearable device is a device which is authenticated to communicate with the mobile terminal 200, the controller 280, for example, may cause transmission of data processed in the mobile terminal 200 to the wearable device via the short-range communication module 214. Hence, a user of the wearable device may use the data processed in the mobile terminal 200 on the wearable device. For example, when a call is received in the mobile terminal 200, the user may answer the call using the wearable device. Also, when a message is received in the mobile terminal 200, the user can check the received message using the wearable device.

The location information module 215 is generally configured to detect, calculate, derive or otherwise identify a position of the mobile terminal. As an example, the location information module 215 includes a Global Position System (GPS) module, a Wi-Fi module, or both. If desired, the location information module 215 may alternatively or additionally function with any of the other modules of the wireless communication unit 210 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

Further, The sensing unit is typically implemented using one or more sensors configured to sense internal information of the mobile terminal 200, the surrounding environment of the mobile terminal 200, user information, and the like. If desired, the sensing unit may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera), a microphone, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 200 may be configured to utilize information obtained from sensing unit, and in particular, information obtained from one or more sensors of the sensing unit, and combinations thereof.

The display unit 250 is generally configured to output information processed in the mobile terminal 200. For example, the display unit 250 may display execution screen information of an application program executing at the mobile terminal 200 or user interface (UI) and graphic user interface (GUI) information in response to the execution screen information.

The interface unit 260 serves as an interface with various types of external devices that can be coupled to the mobile terminal 200. The interface unit 260, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 200 may perform assorted control functions associated with a connected external device, in response to the external device being connected to the interface unit 260.

The memory 270 is typically implemented to store data to support various functions or features of the mobile terminal 200. For instance, the memory 270 may be configured to store application programs executed in the mobile terminal 200, data or instructions for operations of the mobile terminal 200, and the like. Some of these application programs may be downloaded from an external server via wireless communication. Other application programs may be installed within the mobile terminal 200 at time of manufacturing or shipping, which is typically the case for basic functions of the mobile terminal 200 (for example, receiving a call, placing a call, receiving a message, sending a message, and the like). It is common for application programs to be stored in the memory 270, installed in the mobile terminal 200, and executed by the controller 280 to perform an operation (or function) for the mobile terminal 200.

The controller 280 typically functions to control overall operation of the mobile terminal 200, in addition to the operations associated with the application programs. The controller 280 may provide or process information or functions appropriate for a user by processing signals, data, information and the like, which are input or output by the various components depicted in FIG. 4, or activating application programs stored in the memory 270. As one example, the controller 280 controls some or all of the components illustrated in FIG. 4 according to the execution of an application program that have been stored in the memory 270.

The power supply unit 290 can be configured to receive external power or provide internal power in order to supply appropriate power required for operating elements and components included in the mobile terminal 200. The power supply unit 290 may include a battery, and the battery may be configured to be embedded in the terminal body, or configured to be detachable from the terminal body.

The interface unit 260 serves as an interface for external devices to be connected with the mobile terminal 200. For example, the interface unit 260 can receive data transmitted from an external device, receive power to transfer to elements and components within the mobile terminal 200, or transmit internal data of the mobile terminal 200 to such external device. The interface unit 260 may include wired or wireless headset ports, external power supply ports, wired or wireless data ports, memory card ports, ports for connecting a device having an identification module, audio input/output (I/O) ports, video I/O ports, earphone ports, or the like.

The power supply unit 290 receives external power or provides internal power and supply the appropriate power required for operating respective elements and components included in the mobile terminal 200. The power supply unit 290 may include a battery, which is typically rechargeable or be detachably coupled to the terminal body for charging.

The power supply unit 290 may include a connection port. The connection port may be configured as one example of the interface unit 260 to which an external charger for supplying power to recharge the battery is electrically connected.

As another example, the power supply unit 290 may be configured to recharge the battery in a wireless manner without use of the connection port. In this example, the power supply unit 290 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 5:
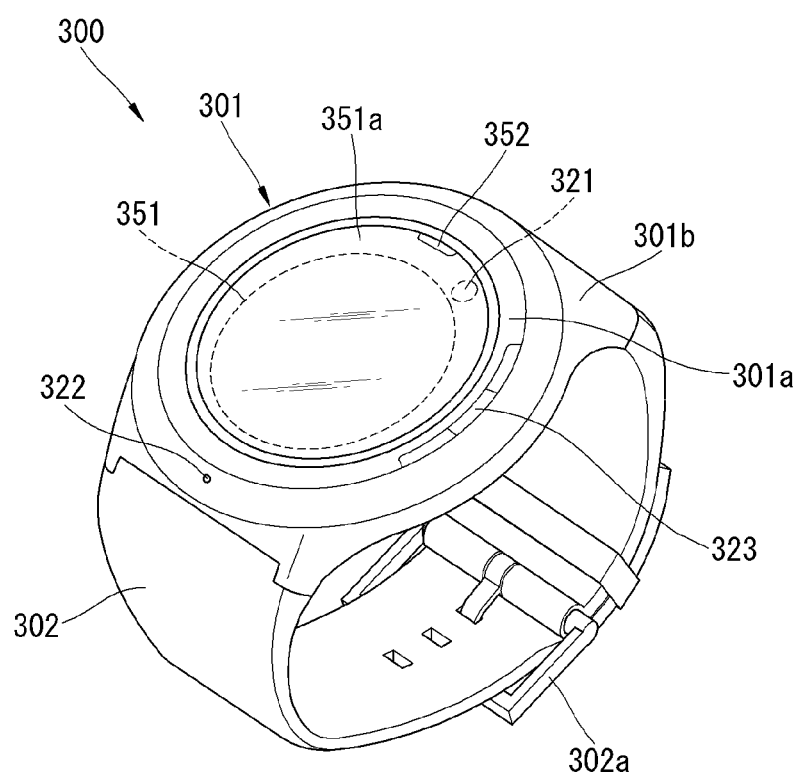
FIG. 5 is a perspective view for showing an example of a watch type mobile terminal 300 which is mirrored to an electronic device according to an embodiment of the present invention.

FIG. 5 is a perspective view for showing an example of a watch type mobile terminal 300 which is mirrored to the electronic device according to an embodiment of the present invention. As illustrated in FIG. 5, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIG. 4.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference. In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 6:
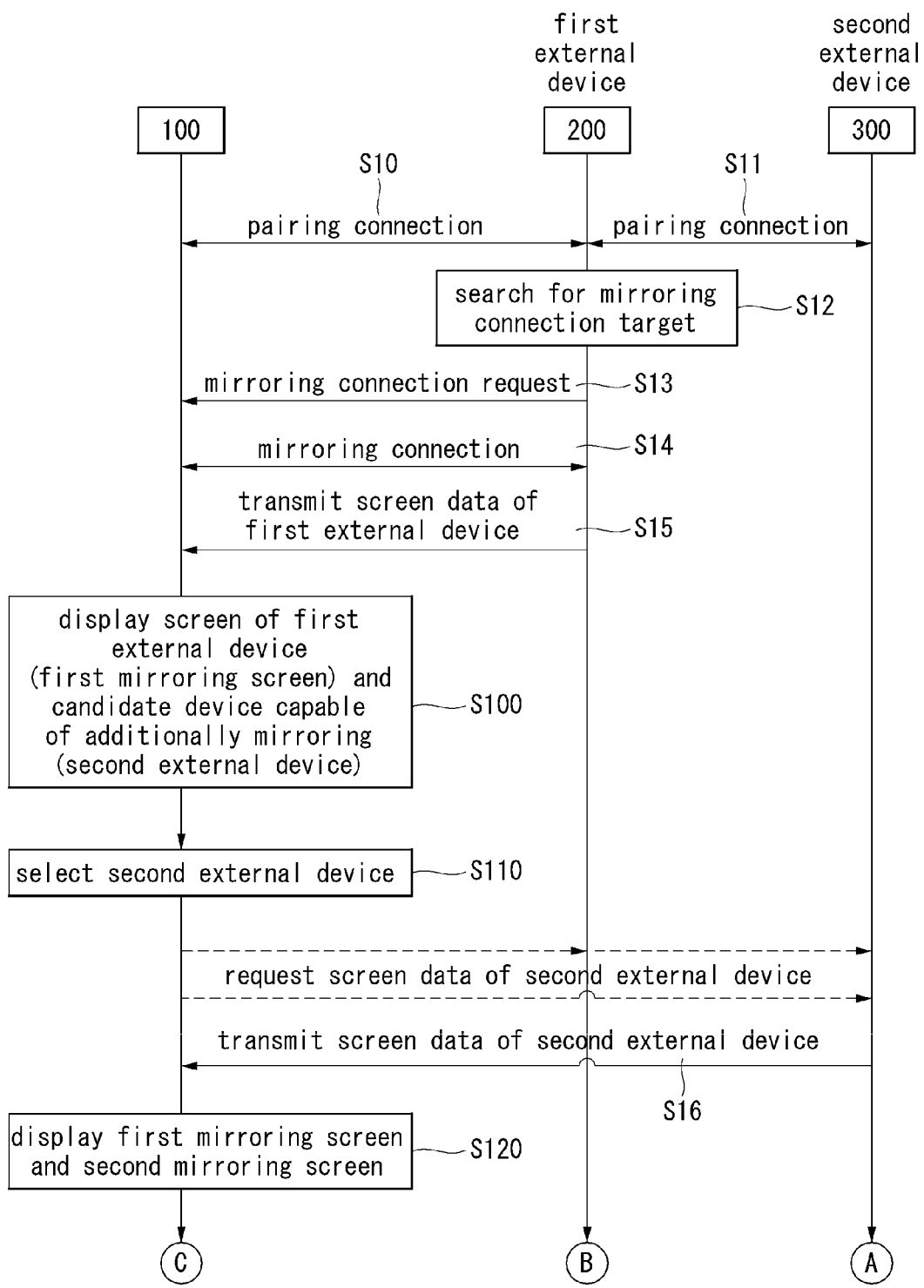
FIG. 6 is a flowchart for illustrating a method for controlling an electronic device according to an embodiment of the present invention.

FIG. 6 is a flowchart illustrating a method for controlling an electronic device according to an embodiment of the present invention. The method for controlling an electronic device according to an embodiment of the present invention can be implemented through the electronic device 100 and the mobile terminals 200, 300 described with reference to FIGS. 1 to 5. Hereafter, with reference to related drawings, the method for controlling an electronic device according to an embodiment of the present invention and operation of the electronic device 100 for implementing the method will be described in detail.

Hereinafter, it is assumed that the mobile terminal 200 which requests a mirroring connection from the electronic device 100 is the first external device, and that the mobile terminal 300 paired with the first external device 200 is the second external device when the first external device 200 requests a mirroring connection from the electronic device 100.

As the electronic device 100 is a display device having a large screen, as described above, the electronic device 100 is assumed as a device such as TV, digital signage. In addition, as the first external device 200 is a mobile terminal, the first external device 200 is assumed as a smartphone. In addition, as the second external device 300 is a wearable device capable of operating being paired with the smartphone, the second external device 300 is assumed as a smart-watch.

Referring to FIG. 6, the electronic device 100 may be paired with the first external device 200 (S10).

The pairing connection may be a short-range communication connection over a short-range communication module. That is, the first external device 200 and the electronic device 100 should be paired with each other beforehand in order for the first external device 200 to request a mirroring connection from the electronic device 100. Meanwhile, according to an embodiment of the present invention, the first external device 200 may be paired with the second external device 300 (S11). To be mirrored to the electronic device 100, the first external device has only to keep being paired with the electronic device 100, but the first external device 200 does not necessarily have to be paired with the second external device 300.

However, an embodiment of the present invention assumes that the first external device 200 and the second external device 300 are also kept being paired with each other as a method that mirroring screen is displayed on the display unit 150 of the electronic device 100 in case that the first external device 200 is kept being paired with the second external device 300 at a point of time at which the first external device 200 requests a mirroring connection from the electronic device 100.

The first external device 200 may perform operation of searching for a mirroring connection target (S12). That is, the first external device 200 may output an advertising signal to search for a mirroring target device located within a predetermined short-range through a control setting for connection to the other devices to neighboring devices. In the state the electronic device 100 is searched, the first external device 200 may transmit a mirroring connection request signal to the electronic device 100 as the first external device 200 receives an input for selecting the electronic device 100 as the mirroring connection target as a result of the search (S13).

The electronic device 100 may maintain a mirroring connection state with the first external device 200 in response to the mirroring connection request of the first external device 200 (S14).

The electronic device 100 may receive screen data of the first external device 200 according to forming of the mirroring communication link with the first external device 200 (S15).

The electronic device 100 may display a screen of the first external device (a first mirroring screen) and a candidate device capable of additional mirroring on the display unit 150 by receiving the screen data of the first external device 200 (S100).

The candidate device capable of additional mirroring, may refer to at least one external device having a pairing history with the first external device 200 when the electronic device 100 receives a mirroring connection request from the first external device 200.

The pairing history with the first external device 200 may refer to a record to maintain currently the pairing state with the first external device 200 or a record to maintain the pairing state with the first external device 200 at least at some point in the past.

At the time the electronic device 100 receives a mirroring connection request from the first external device 200, the electronic device 100 may receive an input for selecting the second external device 300 paired with the first external device 200 (S110).

The controller 180 of the electronic device 100 may be configured to display an object corresponding to at least one external device having a pairing history with the first external device 200 on the display unit 151. The controller 180 of the electronic device 100 may be configured to select the second external device 300 through an input for selecting an object corresponding to the second external device 200 among the at least one object.

The controller 180 of the electronic device 100 may be configured to directly request the screen data of the second external device 300 from the second external device 300 or indirectly request the external device 200 as the second external device 300 is selected.

The second external device 300 may transmit the screen data to the electronic device 100 according to the request of the electronic device 100 (S16).

The controller 180 of the electronic device 100 may be configured to display a first mirroring screen corresponding to the screen of the first external device 100 and a second mirroring screen corresponding to the screen of the second external device 200 on the display unit on the basis of the screen data received from the first external device 200 and the screen data received from the second external device 300 (S120).

Meanwhile, according to an embodiment of the present invention, a method for displaying a mirroring screen may vary on the basis of the operation of the first external device 200 (A, C), and a method for displaying a mirroring screen may vary on the basis of the operation of the second external device 300 (B, C), while the first mirroring screen and the second mirroring screen are being displayed on the display unit 150 of the electronic device 100 according to the mirroring request of the first external device 200.

Hereafter, according to an embodiment of the present invention, a process for mirroring an external device to an electronic device will be described in detail with reference to FIGS. 7 to 8.

Figure 7:
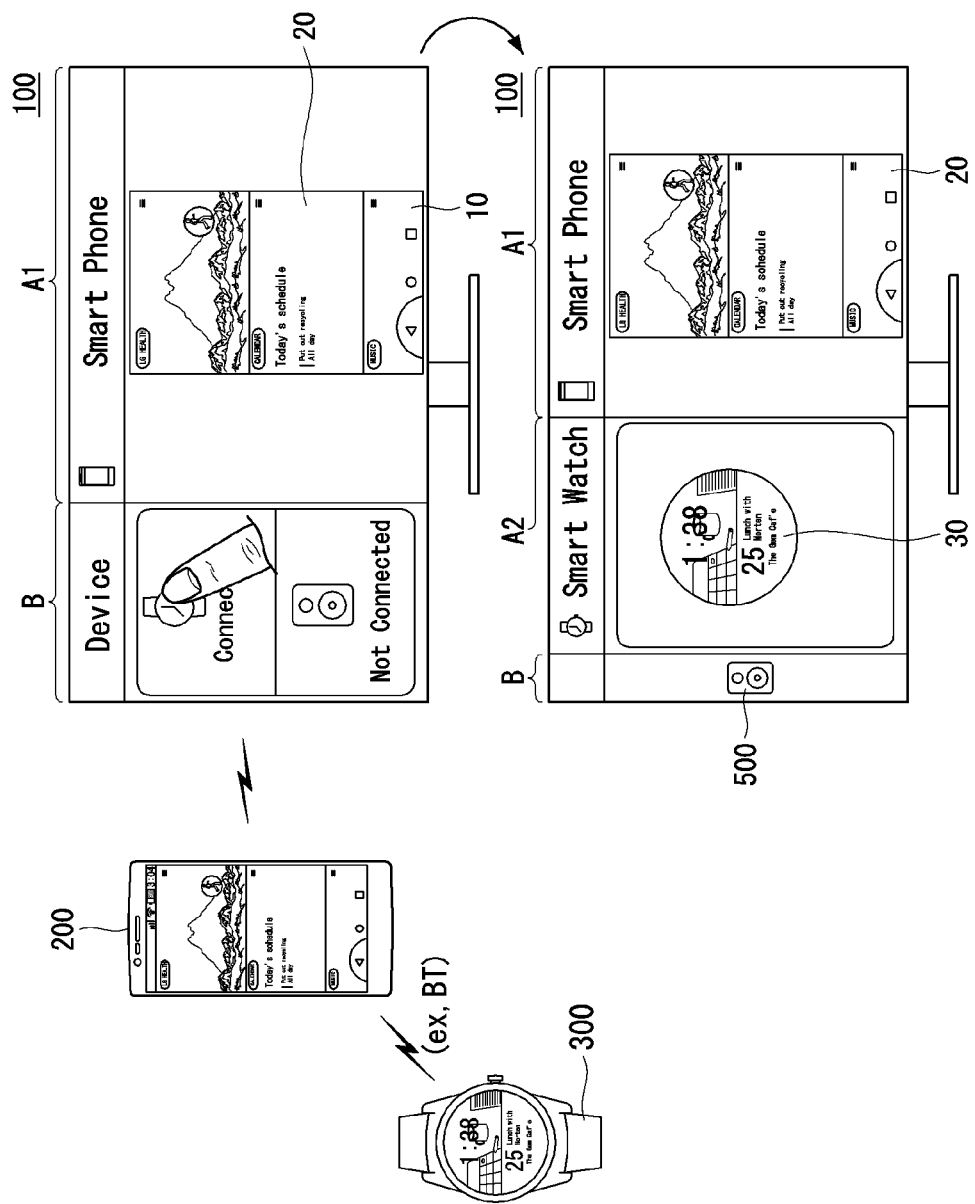
FIGS. 7 to 8 are diagrams for illustrating configurations of a user interface displayed on the display of an electronic device as an external device is mirrored to the electronic device according to an embodiment of the present invention.
Figure 8:
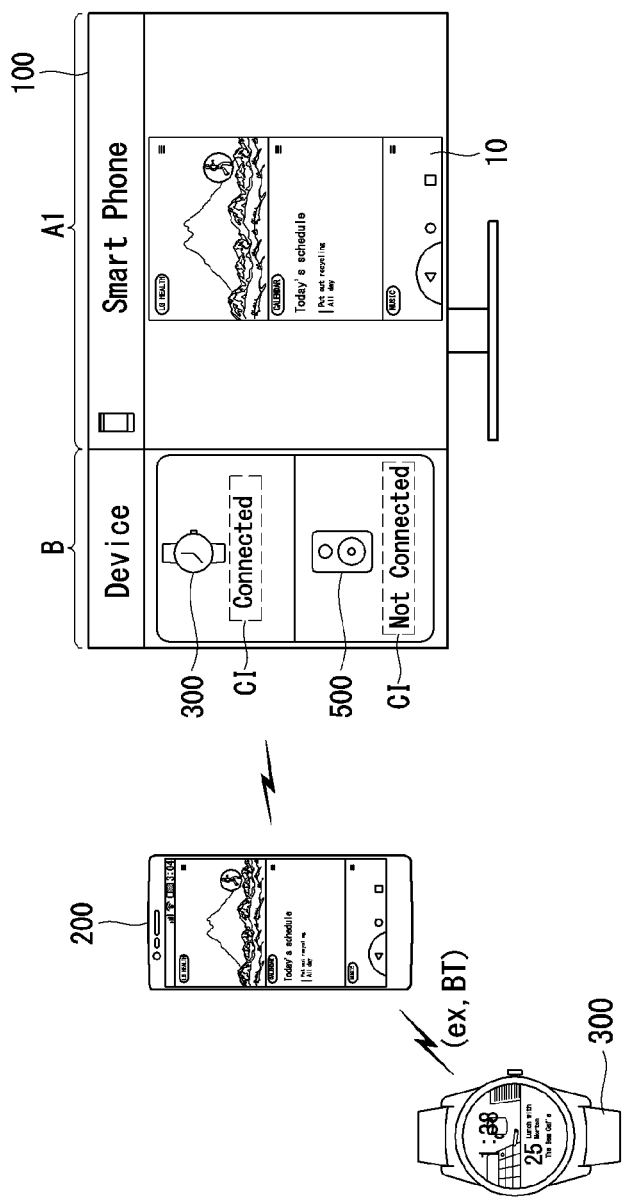

FIGS. 7 to 8 are diagrams for illustrating configurations of a user interface displayed on the display of an electronic device as an external device is mirrored to the electronic device according to an embodiment of the present invention.

Referring to FIG. 7, the first external device 200 may transmit a mirroring request to the electronic device 100 by selecting the electronic device 100 for the mirroring connection. The first external device 200 is paired with a second external device 300.

According to the mirroring connection request of the first external device 200, the electronic device 100 may divide the display unit 151 into a plurality of regions to display a mirrored screen. The plurality of regions may include a first region A1, a second region A2, and a third region B.

The first region A1 may include the first mirroring screen displaying the screen of the first external device 200. Meanwhile, the third region B may display an object corresponding to at least one external device having a pairing history with the external device 100.

For example, the controller 180 may be configured to display identification information (CI) for indicating a pairing connected state with an object corresponding to the second external device 300 currently paired with the first external device 200 in the third region B. In addition, the controller 180 may be configured to display identification information (CI) for indicating a pairing connected state with an object corresponding to a third external device 500 (for example, Bluetooth speaker) having a pairing history in the past but not currently being paired with the first external device 200 in the third region B.

Meanwhile, the controller 180 may be configured to activate and be able to: select the object corresponding to the second external device 300 paired with the first external device, to display the activated object, to inactivate the object corresponding to the third external device 500 not paired with the first external device, and to display the inactivated object at a point of time of receiving the mirroring connection request among the objects corresponding to at least one external device having a pairing history with the first external device 200.

Referring to FIG. 7, the controller 180 may be configured to receive an input for selecting the object corresponding to the second external device 300 among the objects displayed in the third region B. The controller 180 may be configured to receive an input for selecting the object corresponding to the second external device 300 through a remote controller for controlling the electronic device 100.

Meanwhile, the second region A2 includes a second mirroring screen displaying the screen of the second external device paired with the first external device 200. According to an embodiment of the present invention, in the state that first area A1 and the third region B are firstly displayed on the display unit 151, the second region A2 may be displayed to indicate the mirroring screen of the selected device on the display unit 151 in case another device paired with the first external device 200 is selected in the third region B.

A ratio of the first region A1, the second region A2 and the third region B being displayed may be set by the user through a setup menu.

Referring to FIG. 7, the first region Al may include the first mirroring screen 20 and the mirrored first external device information (a smartphone, a graphic object in the smartphone). Also, the second area A2 may include the second mirroring screen 30 corresponding to the smart-watch 300 and the mirrored second external device information (a smart-watch, a graphic object in the smart-watch).

Each of the first region A1 and the second region A2 is a mirroring screen which displays the screen of the external device without any change. However, the third region B is not a mirroring screen but a region for displaying the object having a mirroring history with the first external device. The ratio of the third region B may be relatively smaller than the ratio that is expressed in the first region A1 and the second region A2.

Thus, according to an embodiment of the present invention, when the smartphone screen is mirrored on the TV screen, the screen of the smart-watch paired with the smartphone may be displayed being mirrored on the TV screen together.

In the case of FIGS. 7 to 8, the second external device 300 paired with the first external device 200 was assumed as one smart-watch, however, the present invention is not limited to this. For example, after the electronic device 100 receives a mirroring connection request from the first external device 200, when another external device is additionally paired with a fourth external device (not shown), in a state the first region A1, the second region A2 and the third region B are displayed on the display unit 151, an object corresponding to the fourth external device may be displayed being activated in the third region B. Then, when receiving an input for selecting the object corresponding to the fourth external device, the controller 180 may be configured to generate an additional region for displaying a fourth mirroring screen corresponding to the screen of the fourth external device on the display unit 151.

Hereinafter, a method for controlling an electronic device according to an embodiment of the present invention is described with reference to related drawings showing various examples to be implemented in specific situation.

Figure 9A:
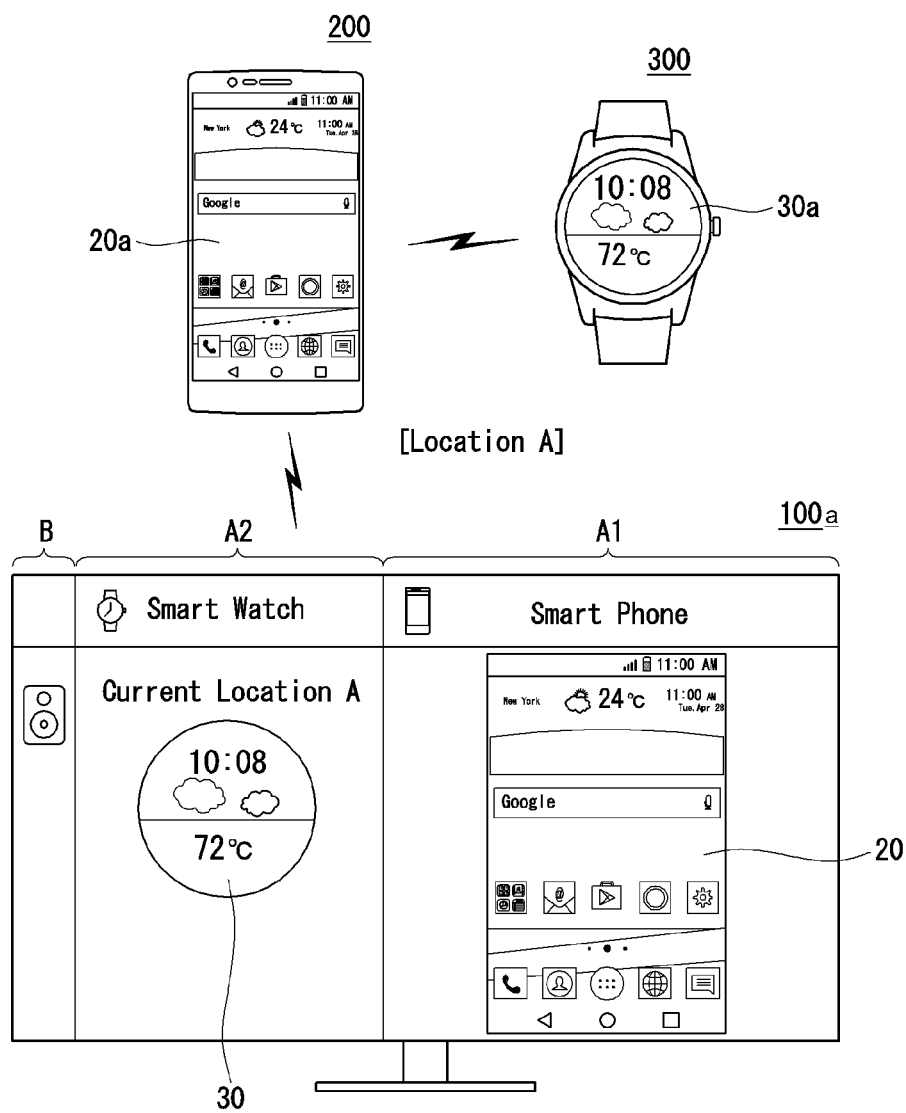
FIGS. 9a to 9b are diagrams for illustrating an example in which an external device is mirrored to an electronic device depending on change of the user's location according to another embodiment of the present invention.
Figure 9B:
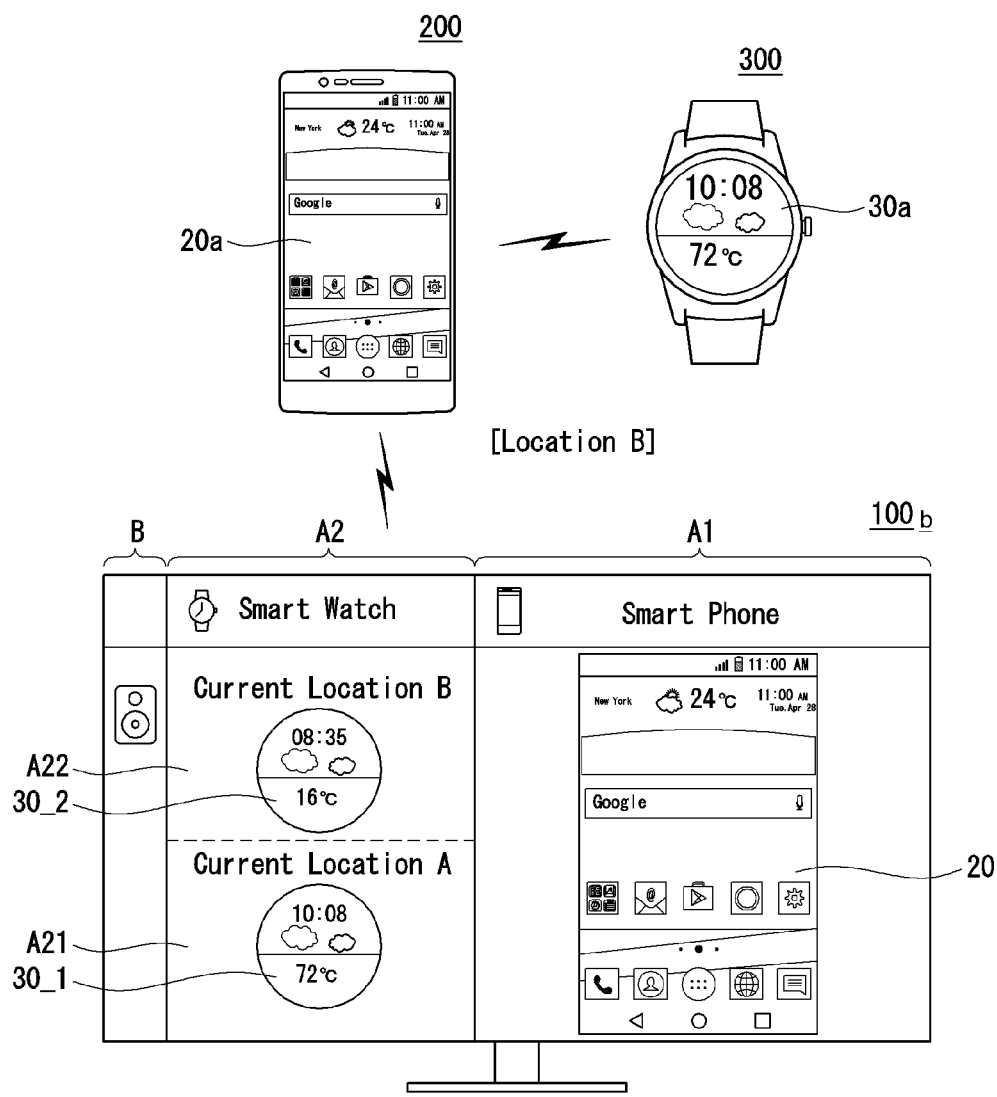

FIGS. 9a to 9b are diagrams for illustrating an example in which an external device is mirrored to an electronic device depending on change of the user's location according to another embodiment of the present invention.

According to an embodiment of the present invention, the electronic device 100 may configure the mirroring screen by reflecting location information of a device being mirrored when displaying the mirroring screen. That is, when the first external device 200 is mirrored to the electronic device 100, the controller 180 may be configured to receive screen data from the first external device 200 and second external device 300, at the same time, the controller 180 may be configured to additionally receive location information of the respective devices. Accordingly, the controller 180 may be configured to reflect the location information and to divide the second mirroring screen into a plurality of regions. The controller 180 may be configured to display the screen of the second external device on each of the divided regions at a point of time at which the first external device 200 is mirrored to the electronic device 100.

For example, referring to FIG. 9a, the smart-watch 300 is being paired with the smartphone 200 at the location A. And the smartphone 200 requests a mirroring connection from a first electronic device 100a at the location A. Accordingly, the first electronic device 100a may divide the display unit 151 into a plurality of regions, display the first mirroring screen 20 in the first region A1 and display the second mirroring screen 30 in the second region A2. At this time, the smartphone 200 and the smart-watch 300 may transmit their location information together with the respective screen data to the first electronic device 100a. Accordingly, the first electronic device 100a may display the information about the "location A" together in the second region A2 which displays a mirroring screen 30 of the smart-watch 300.

As shown in FIG. 9b, location of the smartphone 200 and the smart-watch 300 is now moved to location B from the setting above. After the location is changed, the smartphone 200 may request a mirroring connection from a second electronic device 100b. As a mirroring link is formed between the smartphone 200 and the second electronic device 100b, the second electronic device 100b can receive screen data and location information from the smartphone 200. In addition, the second electronic device 100b can receive screen data and location information from the smart-watch 300. The received location information can additionally receive the previous location information A with the current location information B.

Accordingly, the second electronic device 100b can display a second mirroring screen A2 by dividing it into a region A21 for displaying the screen (30_1) mirrored to the first electronic device 100A at the location A and a region A22 for displaying the screen (30_2) mirrored to the second electronic device 100b at the location B. A screen mirrored to the first electronic device 100a at the location A can provide information such as weather and time information at the location A.

That is, in the case of FIG. 9a to FIG. 9b, when the first electronic device 100a is present at the location A, the second electronic device 100b is present at the location B, in the state the smartphone 200 has a mirroring history with the first electronic device 100a at the location A, as the location of the smartphone 200 changes from A to B, the smartphone 200 may be mirrored to the second electronic device 100b at the location B. At this time, the second electronic device 100b may divide the mirroring screen of the smart-watch 300 paired with the smartphone 200 into the mirroring screen of region A in the past and the mirroring screen of region B in the present, and may separately provide the mirroring screen of region A in the past and the mirroring screen of region B in the present.

Figure 10:
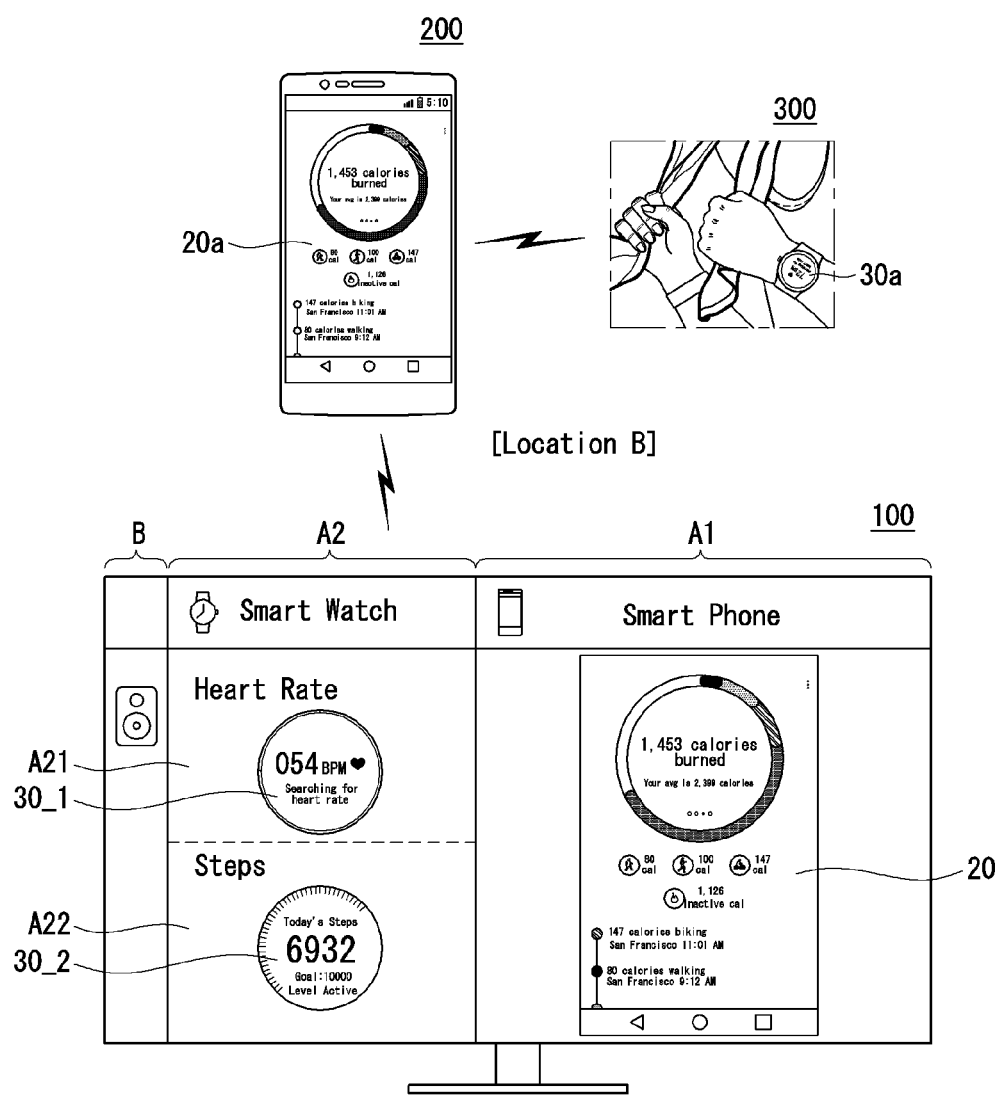
FIG. 10 is a diagram for illustrating an example in which a first external device and a second external device are mirrored to the electronic device by the application being executed in the first external device according to another embodiment of the present invention.

FIG. 10 is a diagram for illustrating an example in which a first external device and a second external device are mirrored to the electronic device by the application being executed in the first external device according to another embodiment of the present invention.

The electronic device 100 according to an embodiment of the present invention may display the first mirroring screen and the second mirroring screen on the display unit 151. The first mirroring screen may include an execution screen of a first application executed in the first external device 200. In addition, the second mirroring screen may include an execution screen of a second application executed in the second external device to aid the execution of the first application in conjunction with the first application.

For example, referring to FIG. 10, the smartphone 200 executes a first application that can provide the user's health information through biometric information. Meanwhile, the smart-watch 300 paired with the smartphone 200 may execute a second application capable of measuring the biometric information as the first application is run on the smartphone 200.

The second application may be an application for measuring the user's heart rate or an application having a function to measure the number of steps according to the user's movement. For example, the user's heart rate may be measured by contacting with the user's body part in one area of the smart-watch 300 body. In addition, the number of footsteps of the user can be obtained through motion recognition sensed by an attitude sensor (e.g., a gyroscope and accelerometer) installed in the smart-watch 300.

Therefore, in case a smartphone 200 is mirrored to the electronic device 100 while an exercise application which utilizes biometric information is executed on the smartphone 200, the electronic device 100 displays the first mirroring screen 20 corresponding to the screen of the smartphone 200 and the second mirroring screen corresponding to the screen of the smart-watch 300 on the display unit 150. However, the second mirroring screen may include an execution screen (30_1) of a heart rate monitor application and an execution screen (30_2) of a pedometer application.

Thus, according to an embodiment of the present invention, after the user performs a workout by executing a workout application on the smartphone 200 while wearing a smart-watch 300 and mirrors the smartphone 200 to a nearby TV 100 to monitor workout performance, the user can check his or her workout performance more efficiently since both screens of the smartphone 200 and the smart-watch 300 are mirrored.

Figure 11A:
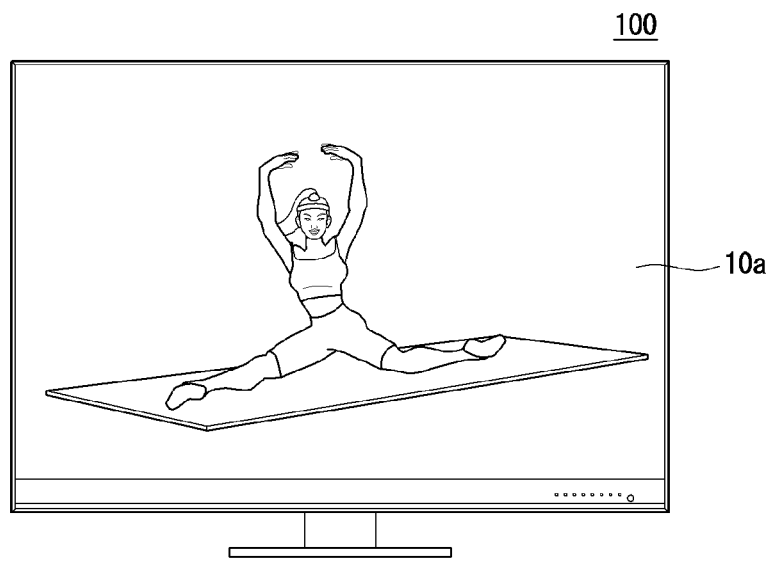
FIGS. 11a to 11b are diagrams for illustrating an example in which a first external device and a second external device are mirrored to an electronic device while a broadcast program is displayed according to another embodiment of the present invention.
Figure 11A:
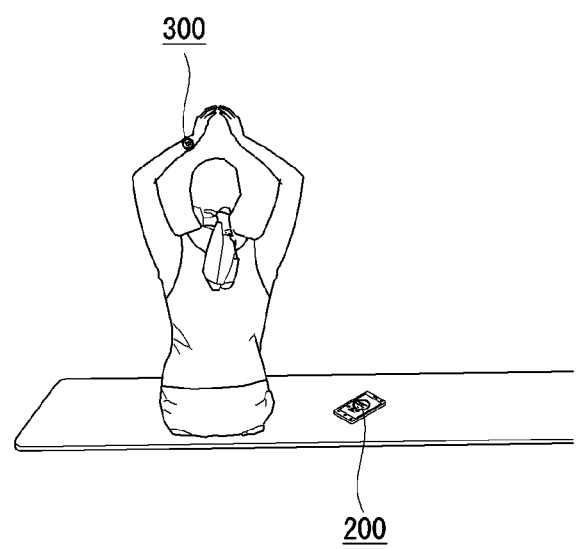
Figure 11B:
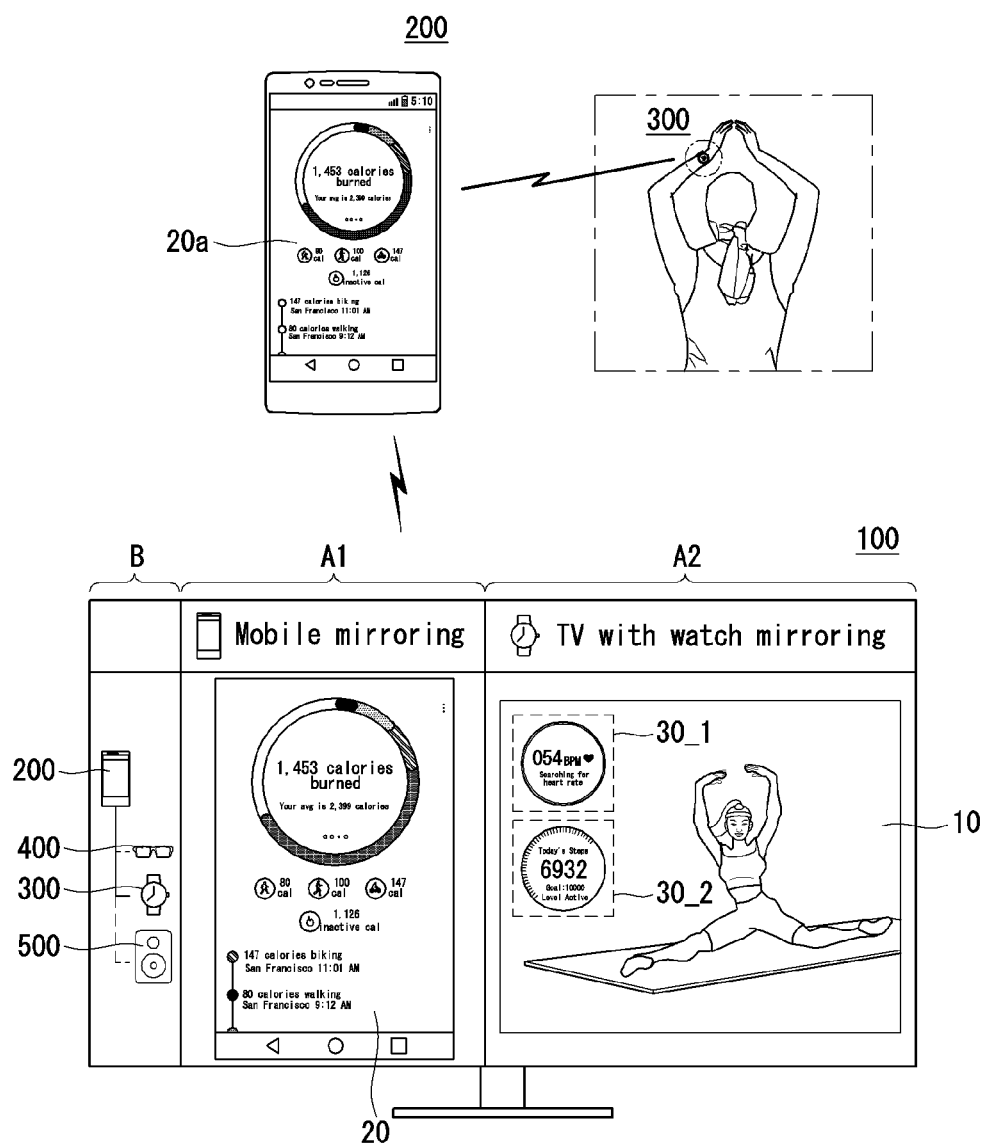

FIGS. 11a to 11b are diagrams for illustrating an example in which a first external device and a second external device are mirrored to an electronic device while a broadcast program is displayed according to another embodiment of the present invention.

Referring to FIG. 11a, according to an embodiment of the present invention, an electronic device 100 may receive a broadcast program 10a from a broadcast station through the reception unit and provide the broadcast program 10a via the display unit 151. Meanwhile, the user may watch the broadcast program 10a while wearing the second external device (smartwatch) 300. The second external device 300 is paired with the first external device 200.

Referring to FIG. 11b, the first external device 200 executes the workout application, and an execution screen 20a of the workout application is being displayed on the screen of the first external device 200. In this situation, in case the first external device 200 forms a mirroring link with the electronic device 100, the controller 180 of the electronic device 100 may display the mirroring screen on the display unit 151

The controller 180 may be configured to display the first mirroring screen 20 in the first area A1. Meanwhile, the control unit 180 displays the second mirroring screen 30_1, 30_2 corresponding to the second external device 300 in the second area A2. However, a broadcasting program screen 10 continuously provided before mirroring connection may be displayed in the second area A2. The second mirroring screen 30_1, 30_2 may be displayed being overlapped on at least one portion of the broadcast program screen 10.

In addition, the second mirroring screen 30_1, 30_2 may correspond to the execution screen of an application for monitoring biometric information required for execution of the workout application being executed in the first external device 200.

The controller 180 may be configured to display information of a plurality of external devices 300, 400, 500 having a pairing history with the first external device 200 in the third region B and to display the activation state of each external device according to its connection state with respect to the first external device 100 at the time of receiving a pairing request. For example, the controller 180 may be configured to display a mobile terminal 400 of glass type and a Bluetooth speaker 500, which are not paired with the first external device 200, in the third region B as being in an inactivation state. Therefore, even if the user selects an inactive object via the remote controller, the corresponding object may not be selected. Meanwhile, the controller 180 may be configured to display the smart-watch 300 shown in the third region B as being in the activation state indicating that the smart-watch is paired with the first external device 200.

Figure 12A:
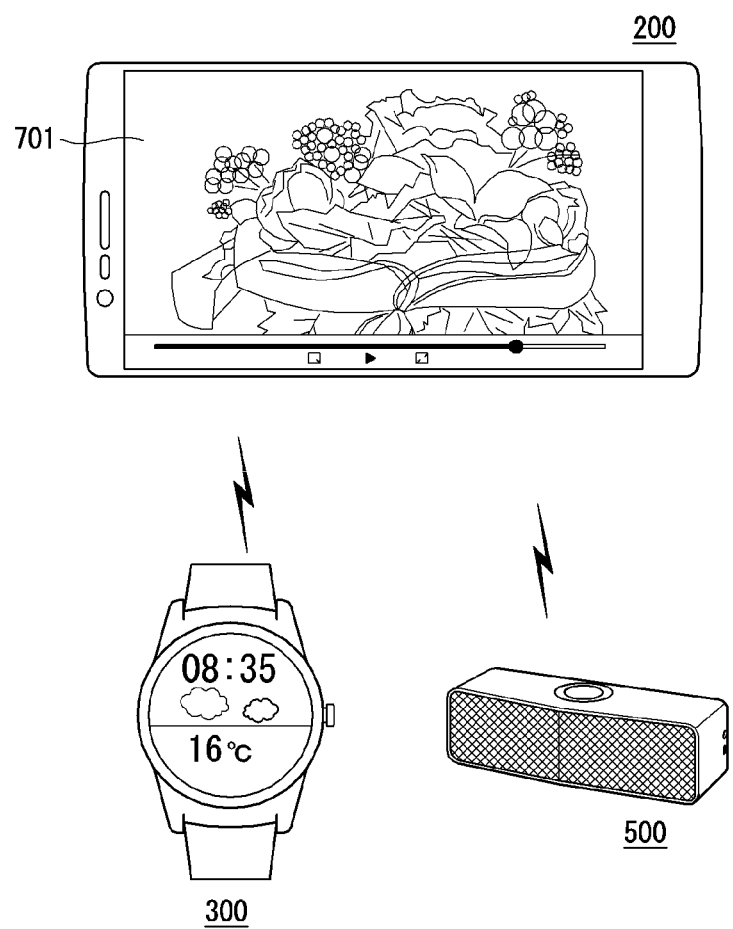
FIGS. 12a to 12b are diagrams for illustrating an example of controlling operation of an external device paired with another external device via a mirroring screen while an external device is mirrored to an electronic device according to a still another embodiment of the present invention.
Figure 12B:
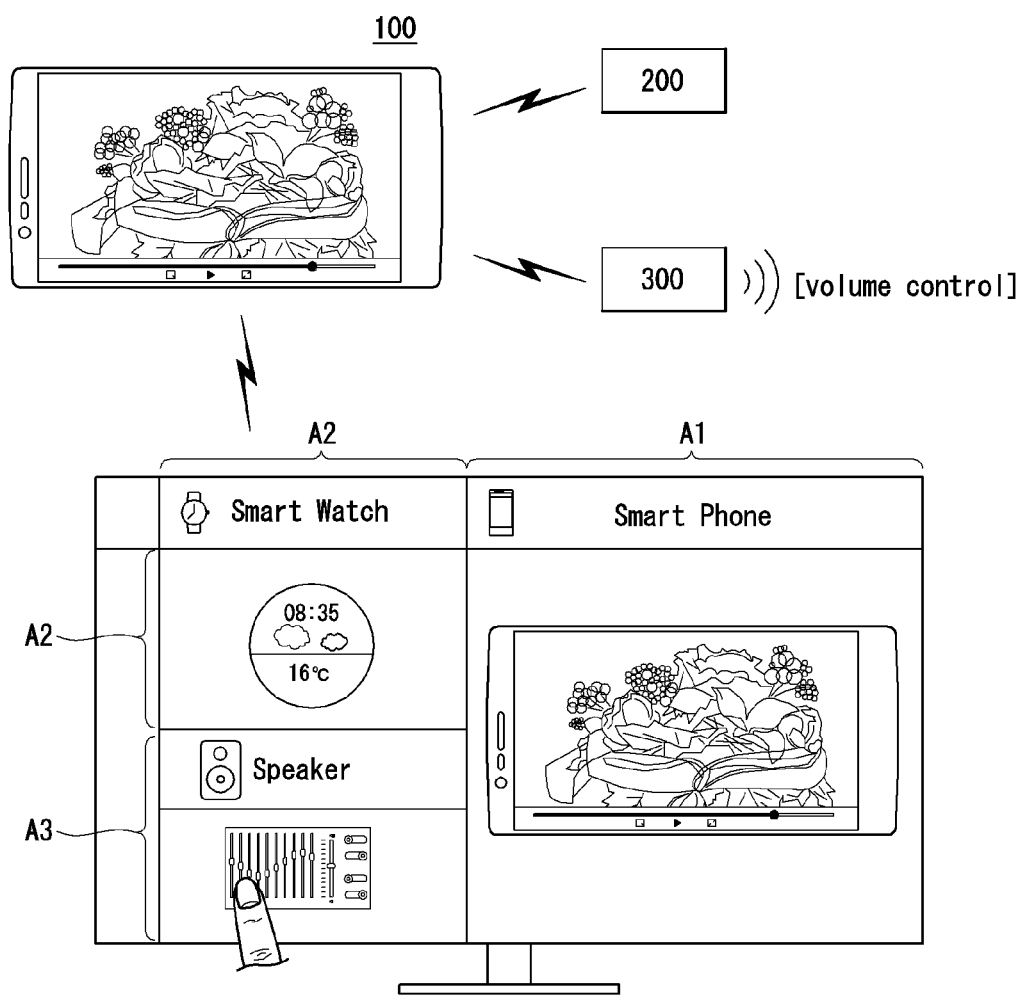

FIGS. 12*a* to 12*b* are diagrams for illustrating an example of controlling operation of an external device paired with another external device via a mirroring screen while an external device is mirrored to an electronic device according to a still another embodiment of the present invention.

Referring to FIG. 12*a*, according to an embodiment of the present invention, the first external device 200 may be mirrored to the electronic device 100 while the first external device 200 is paired with the second external device 300 and the third external device 500. A reproduction screen 701 for multi-media contents may be provided in the screen of the first external device 200. The third external device 500 is a Bluetooth speaker and can produce a sound output through the Bluetooth speaker when the paired first external device 200 plays predetermined multi-media contents.

Referring to FIG. 12*b*, when the first external device 200 is mirrored to the electronic device 100, the electronic device 100 may display a first mirroring screen corresponding to the screen of the first external device 200 in the first region A1 and a second mirroring screen corresponding to the screen of the second external device 300 in the second region A2. Since the third external device 500 is a Bluetooth speaker and is not equipped with a screen, the controller 180 can be configured to display a control object through which the user can control sound output in the three region A3 by taking into account the fact that the third external device 500 is a Bluetooth speaker.

When a remote controller 5 receives an input for operating the control object, the controller 180 may be configured to transmit a control signal for adjusting the volume output from the third external device 300 to the third external device 300.

In other words, the embodiment shown in FIG. 12*a* to FIG. 12*b* can control so that a predetermined function can be executed on an external device mirrored to the electronic device 100 through the mirroring screen displayed on the display unit 151 of the electronic device 100.

Figure 13:
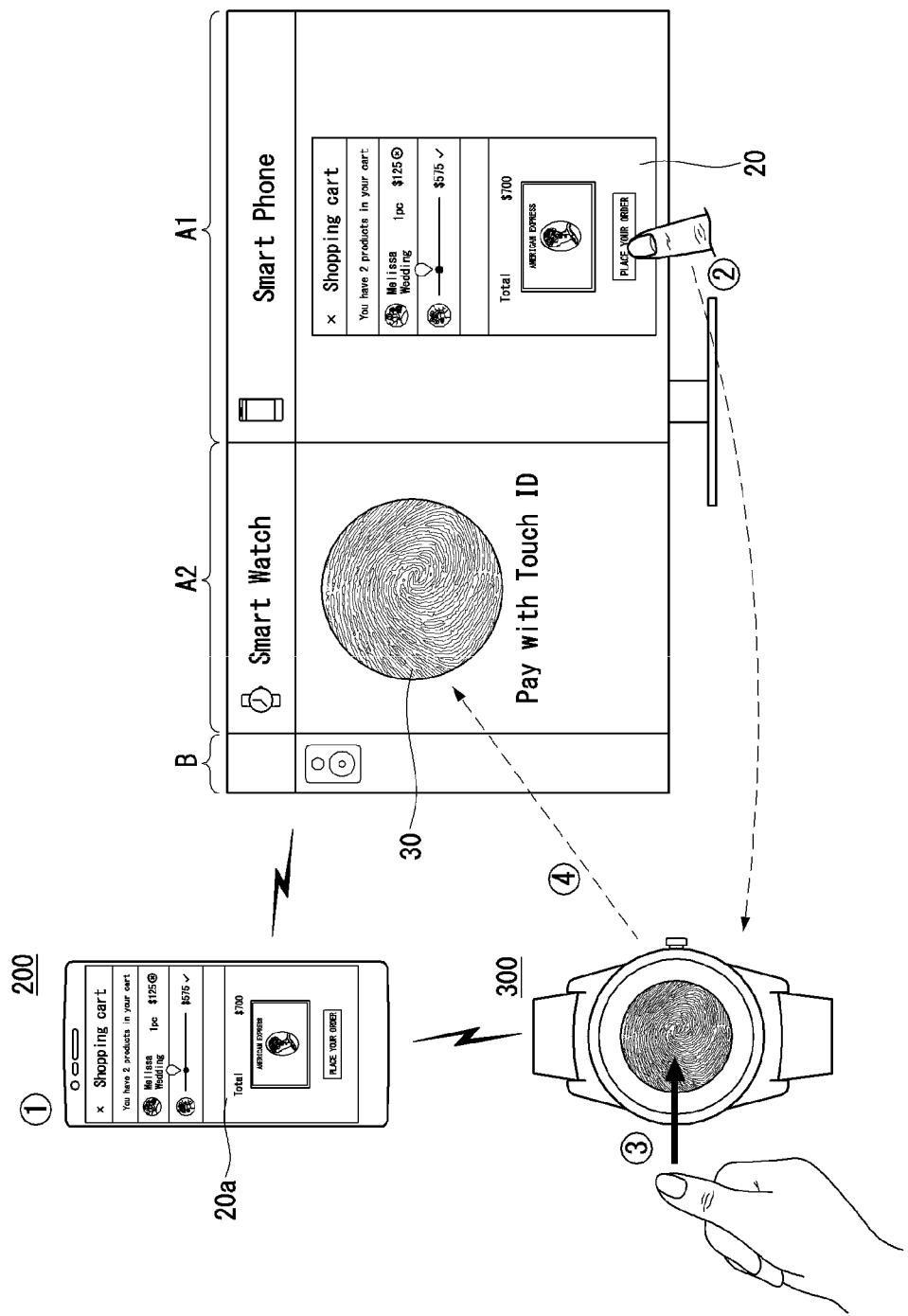
FIG. 13 is a diagram for illustrating an example of providing an authentication process via an external device paired with another external device through a mirroring screen while the latter external device is mirrored to an electronic device according to an additional embodiment of the present invention.

FIG. 13 is a diagram for illustrating an example of providing an authentication process via an external device paired with another external device through a mirroring screen while the latter external device is mirrored to an electronic device according to an additional embodiment of the present invention.

Referring to FIG. 13, according to an embodiment of the present invention, the first external device 200 may be mirrored to the electronic device 100 while performing an application 20*a* requiring an authentication process. The application requiring the authentication process may include an application which performs a function that requires payment through a mobile payment system. The authentication process may be performed by a predetermined input pattern preset by a user or by a fingerprint authentication.

According to an embodiment of the present invention, while the first mirroring screen 20 corresponding to the first external device 200 is displayed in the first region Al, and the second mirroring screen 30 corresponding to the second external device 300 is displayed in the second region A2, the fingerprint authentication may be required.

When the controller 180 receives the fingerprint authentication request, the controller 180 may display a fingerprint input region TP on the screen of the second external device 300 to perform the fingerprint authentication process through the screen of the second external device 300. At the same time, a screen containing a fingerprint input region TP may also be provided for the second mirroring screen 30. When the user's fingerprint is input through the fingerprint input region TP displayed on the screen of the second external device 300, the authentication process can be performed on the basis of the input fingerprint information, and the input fingerprint information can be displayed on the second mirroring screen 30.

Accordingly, while goods purchase information is displayed on the screen of the first external device 200, the user can select a fingerprint input device 500 from the first external device 200 through the mirroring screen on the electronic device 100 without separate screen switching for a fingerprint input and perform the authentication process more smoothly through the fingerprint information input to another device, thereby performing a mobile payment function.

Figure 14A:
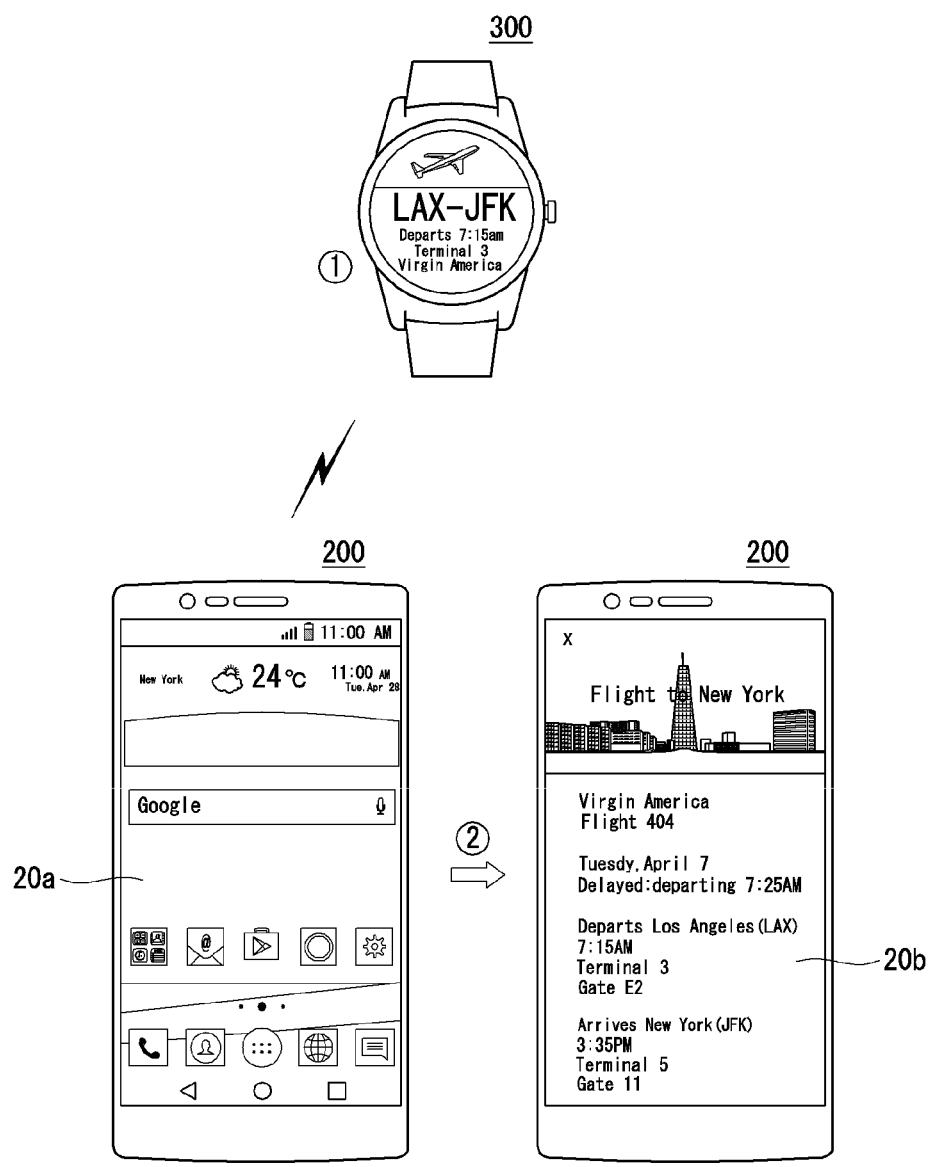
FIGS. 14a to 14b are diagrams for illustrating an example of varying configuration of a mirroring screen depending on an application executed in another external device paired with an external device when the latter external device is mirrored to an electronic device according to a further embodiment of the present invention.
Figure 14B:
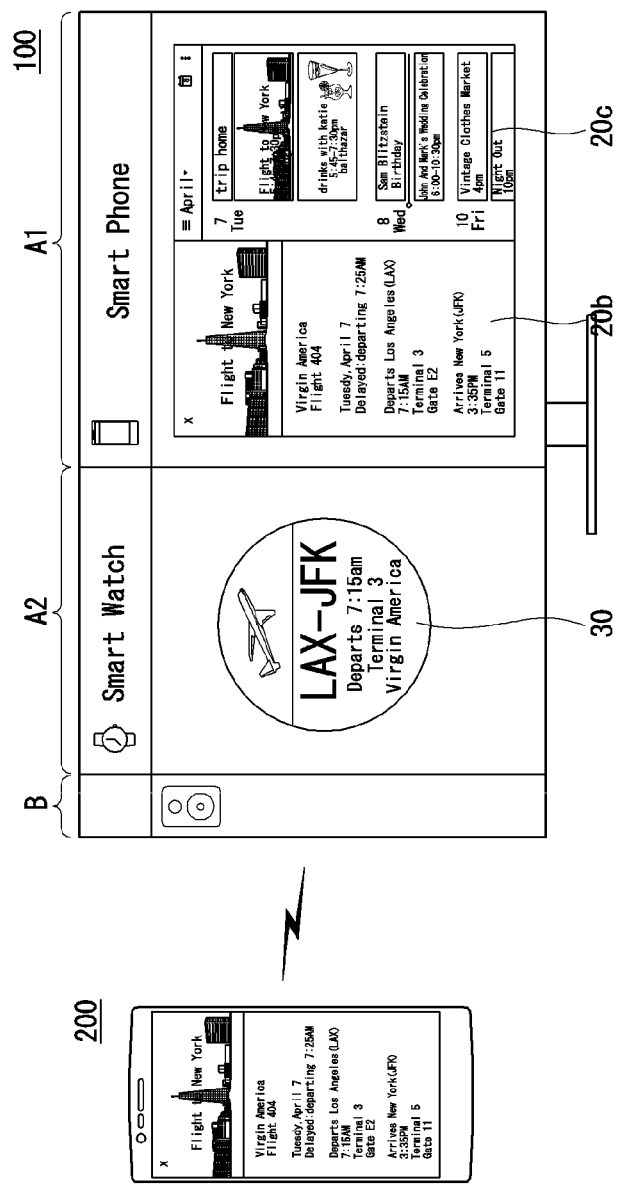

FIGS. 14*a* to 14*b* are diagrams for illustrating an example of varying configuration of a mirroring screen depending on an application executed in another external device paired with an external device when the latter external device is mirrored to an electronic device according to a further embodiment of the present invention.

According to an embodiment of the present invention, when the second external device 300 executes a second application 30*a* while the second external device 300 is paired with the first external device 200, the first application which is executed in conjunction with the second application 30*a* in the first external device 200 may be automatically executed.

For example, referring to FIG. 14*a*, the second application may be an application that manages tickets on the mobile network. The user may check the airline tickets purchased by executing the second application through the second external device 300.

Referring to FIG. 14*b*, while checking the airline ticket through the second external device 300, the first external device 200 may be mirrored to the electronic device 100. The first external device 200 can search for schedule information associated with the checked ticket information while attempting to establish a mirroring connection.

Then, if the first external device 200 is mirrored to the electronic device 100, the controller 180 of the electronic device 100 may be configured to display the ticket information checked through the second external device 300 on the second mirroring screen 30. And the first mirroring screen may include specific schedule information 20*c* registered according to the detailed flight information 20*b* and the flight schedule.

Figure 15:
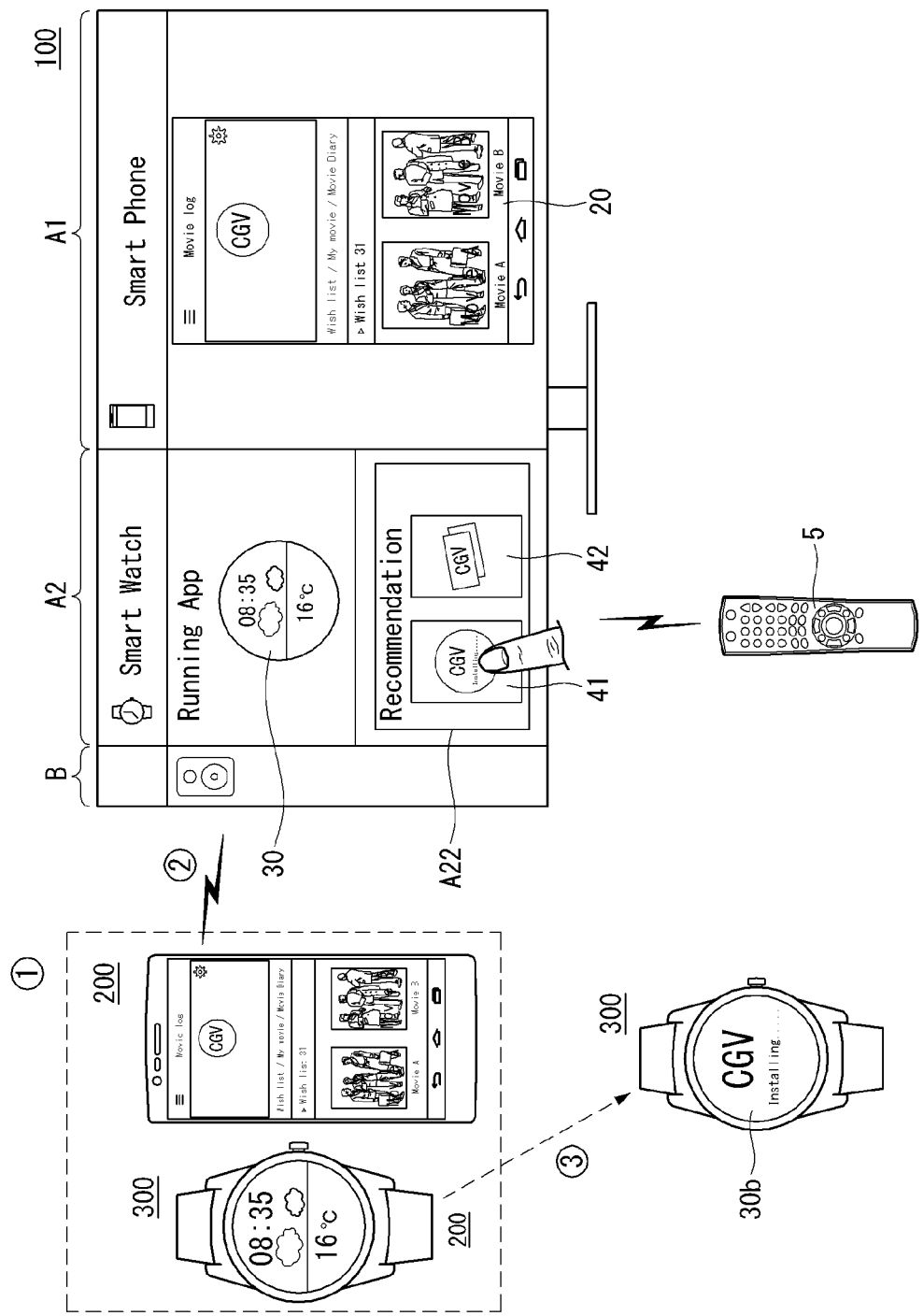
FIGS. 15 to 16 are diagrams for illustrating an example of recommending predetermined content for an external device mirrored together through a mirroring screen depending on operation executed in another external device before a mirroring connection between the latter external device and an electronic device is established according to a yet further embodiment of the present invention.
Figure 16:
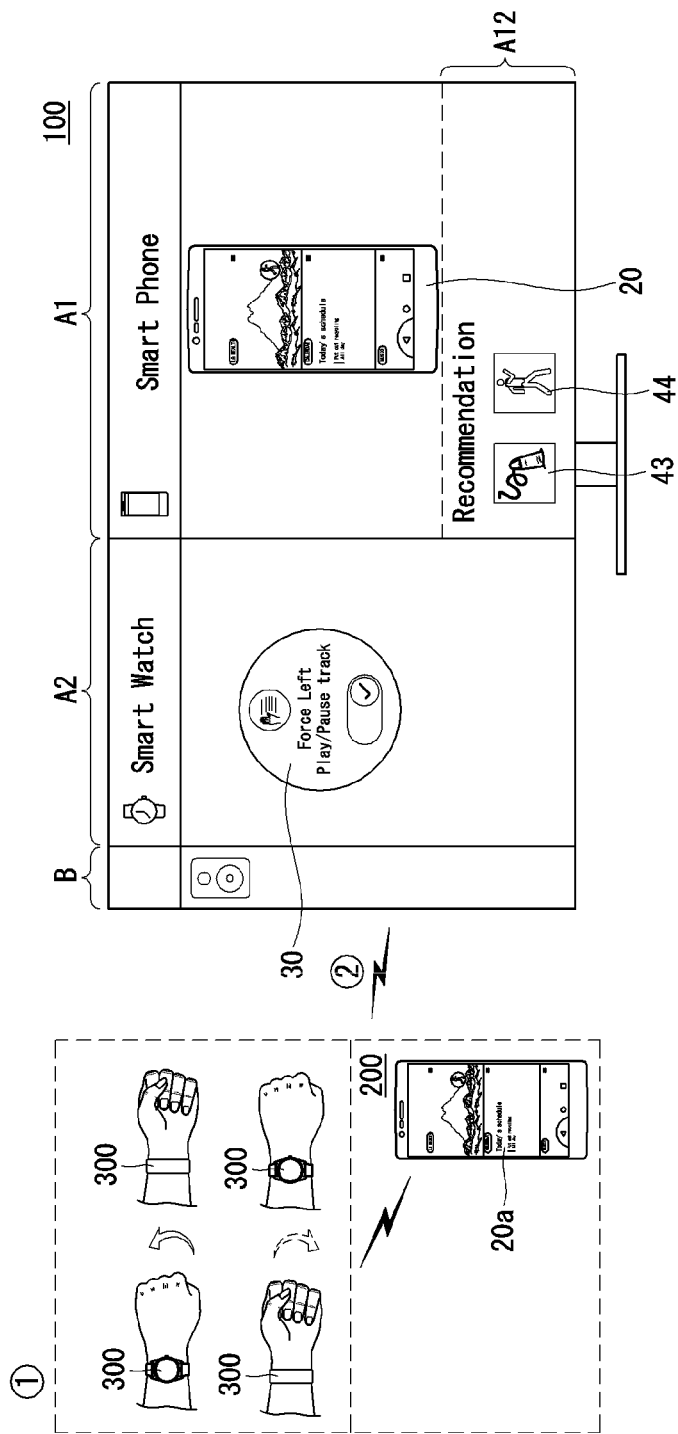

FIGS. 15 to 16 are diagrams for illustrating an example of recommending predetermined content for an external device mirrored together through a mirroring screen depending on operation executed in another external device before a mirroring connection between the latter external device and an electronic device is established according to a yet further embodiment of the present invention.

According to an embodiment of the present invention, while the first application is executed on the external device 200, the controller 180 can receive a mirroring connection request from the first external device 100.

If the first application is not installed in the second external device 300, the controller 180 may be configured to display at least one recommended application associated with the first application on the display unit. If one of the recommended applications is selected, the controller 180 can control the selected application to be installed in the second external device.

Referring to FIG. 15, the first application may include an application to purchase a movie ticket. The first application screen 20a is displayed on the screen of the first external device 200. The home screen 30a is displayed on the second external device 300. Accordingly, the first mirroring screen 20 may be provided with the first application screen. Meanwhile, if the first application is installed in the second external device 300, the second external device 300 may provide the first application screen for the second mirroring screen. Otherwise, only the aforementioned home screen may be provided for the second mirroring screen 30.

Meanwhile, when the first application is not installed in the second external device 300, the controller 180 may be configured to recommend applications 41, 42 that are the same as or similar to the first application and display them in one region A22 of the display unit 150. Meanwhile, when the controller 180 receives an input for selecting any one of the recommended applications 41, 42 from the remote controller 5, the controller 180 may be configured to transmit a control signal to make the selected application 41 installed in the second external device 300 to the second external device 300.

The second external device 300 may download the selected application 41 from an external server and automatically install the selected application 41 in accordance with the control signal. Accordingly, the screen of the second external device 300 may be converted into the screen for downloading the selected application 41 from the home screen 30a.

Accordingly, according to an embodiment of the present invention, an application that is the same as or similar to the applications installed in the first external device 200 may be installed in the second external device 300 paired with the first external device 200 through the mirroring screen of the electronic device 100.

Meanwhile, according to an embodiment of the present invention, the controller 180 may be configured to receive a mirroring connection request from the first external device while executing a second application in the second external device 200.

The controller 180 may be configured to display at least one recommended application associated with the second application on the display unit 151. If one of recommended applications is selected, the controller 180 may be configured to control the selected application to be installed in the first external device 200. Meanwhile, the second application may be an application executed according to a gesture input of the second external device 300.

For example, referring to FIG. 16, the smartwatch 300 can recognize the user's gesture through movement of the wrist wearing the smartwatch 300. The second application may be an application in which a predetermined function can be executed in the smartwatch 300 according to the user's gesture. For example, the second application can be an application for playing music and can include an application for controlling music play according to the tilt direction of the user's wrist.

The controller 180 of the electronic device 100 may be configured to receive a mirroring connection request from the first external device 200 while the predetermined gesture is recognized through the smart-watch 300.

The controller 180 may be configured to display a first mirroring screen 20 and a second mirroring screen 30 respectively in accordance with the mirroring connection request on the display unit 151. The controller 180 can display applications with a function similar to the second application among the applications installed in the first external device 200 in one region A12 of the display unit 151. In other words, the controller 180 can display a list 43, 44 of the application that can be executed according to a gesture input in one region A12 of the display unit 151. The one region A12 can be generated at the lower end A12 of the first region A1 in which a first mirroring screen is displayed.

Figure 17:
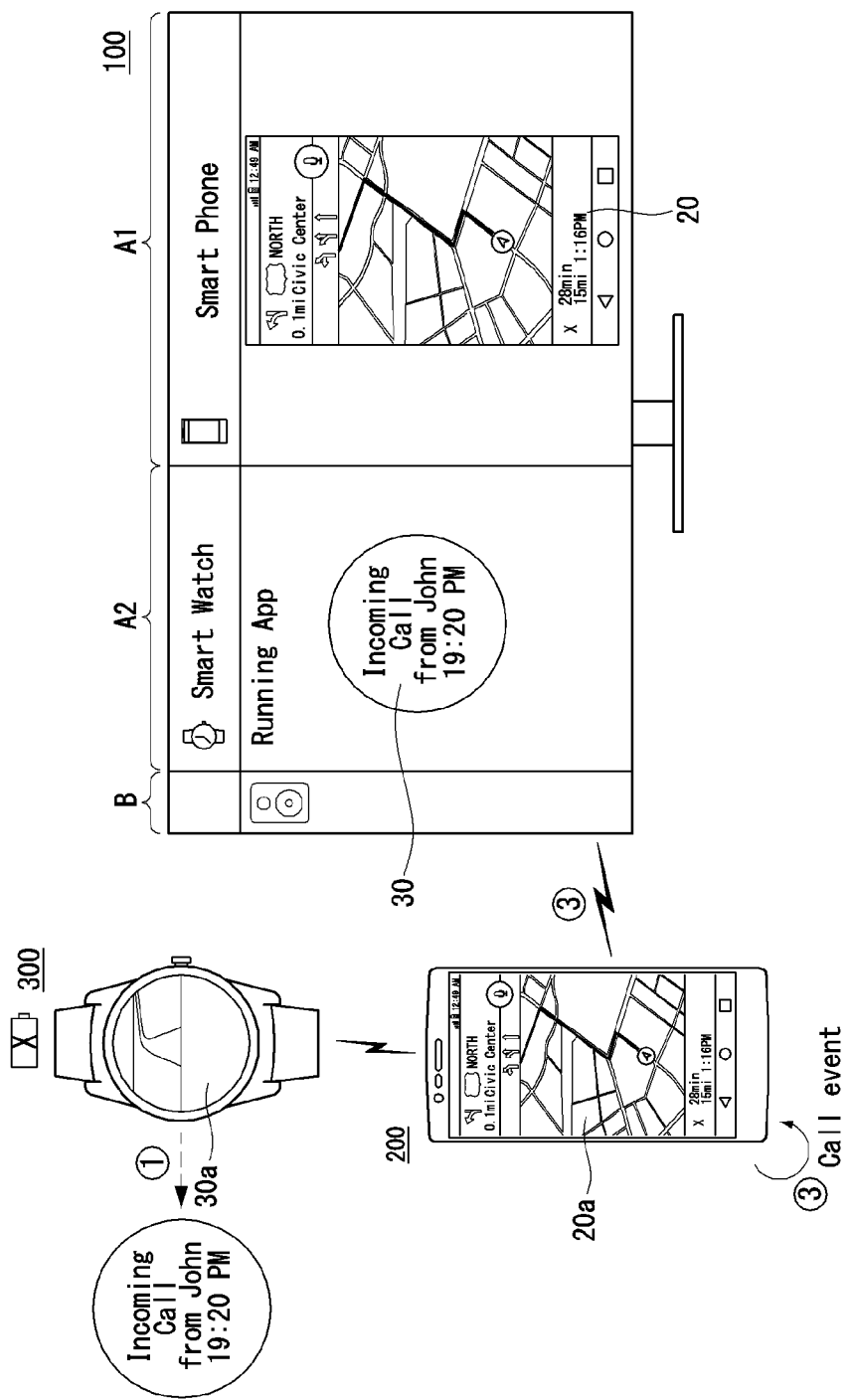
FIG. 17 is a diagram for illustrating an example of processing an event occurred on an external device through a mirroring screen while a mirroring connection between the external device and an electronic device is established according to a still further embodiment of the present invention.

FIG. 17 is a diagram for illustrating an example of processing an event occurred on an external device through a mirroring screen while a mirroring connection between the external device and an electronic device is established according to a still further embodiment of the present invention.

Referring to FIG. 17, when the second external device 300 detects that the battery power goes below a predetermined value while executing a navigation application, the second external device 300 can hand over the control of the navigation application to the paired first external device 200. In this case, the navigation application execution screen 20a is provided on a screen of the first external device 200.

In this situation, the electronic device 100 may receive a mirroring connection request from the first external device 200. The controller 180 may be configured to display a first mirroring screen 20 and a second mirroring screen 30 on the display unit 151. Because the second external device 300 has handed over the control of the navigation application to the first external device 200, the second mirroring screen 30 may be a home screen of the smart-watch.

Meanwhile, the second external device 200 may receive a call while executing the navigation application. The second external device 200 can provide a call waiting screen because the second external device 200 executes the navigation application. The call waiting screen can be provided as a notification signal on the screen of the paired second external device 300, and the call waiting screen provided on the screen of second external device 300 may be displayed as a second mirroring screen 30 in the electronic device 100.

According to an embodiment of the present invention, when the first device is mirrored to the electronic device 100, the situation in which at least one different device paired with the first device is mirrored to the electronic device 100 is not limited to the foregoing examples.

For example, when a motion of taking off the smartwatch is detected, a mobile terminal paired with the smart-watch can be mirrored together to a TV screen, and at least one event recorded for a day through the smart-watch or the mobile terminal can be provided through the mirrored screen.

In addition, for example, suppose a member executes a workout application on the smartphone while a trainer teaches the member a workout program in a fitness center, and the smartphone is mirrored into a large screen in the fitness center while the member wearing a smart-watch performs workouts. Then the trainer is able to more accurately recognize the amount of exercise performed by the member displayed on the large screen.

In addition, an electronic device 100 described in the above examples may include a display device used in public areas.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present invention. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. An electronic device, comprising:
a communication unit;
a display;
a user input interface unit; and
a hardware controller configured to:
receive first screen data of a first external device via the communication unit;
receive second screen data, from the first external device via the communication unit, of a second external device paired with the first external device;
cause the display to display a first mirroring screen in a first region corresponding to the first screen data and a third region, the third region displaying one or more objects corresponding to at least one candidate external device having a pairing history with the first external device, when a mirroring connection request is received from the first external device via the communication unit, wherein the first mirroring screen includes a first execution screen of a first application executed at the first external device and wherein an object to be selected from the one or more objects is activated or deactivated based on a current pairing connection status of its corresponding candidate external device with the first external device;
receive, from the user input interface unit, a user input for selecting a displayed object corresponding to the second external device, wherein the displayed object is selected from the one or more objects displayed in the third region corresponding to the at least one candidate external device having the pairing history with the first external device; and
in response to receiving, from the user input interface unit, the user input for selecting the displayed object corresponding to the second external device, cause the display to display a second mirroring screen in a second region corresponding to the second screen data simultaneously with the first mirroring screen displayed in the first region, wherein the second mirroring screen includes a second execution screen of a second application executed at the second external device in connection with the first application.

2. The electronic device of claim 1, wherein a ratio of sizes of the first region, the second region and the third region is preset by a user.

3. The electronic device of claim 1, wherein the hardware controller is further configured to cause the display to display:
the object corresponding to the second external device to be selectable when the mirroring connection request is received; and
any remaining one or more objects to be non-selectable when the corresponding candidate external device of each of the remaining one or more objects is not paired with the first external device.

4. The electronic device of claim 1, wherein:
the second screen data includes location information of the second external device when the mirroring connection request is received; and
the hardware controller is further configured to cause the display to divide the second mirroring screen into a plurality of regions, wherein each region includes updated second screen data corresponding to different locations of the second external device.

5. The electronic device of claim 1, further comprising a receiver, wherein the second region in which the second mirroring screen is displayed further comprises a content program screen received via the receiver, and wherein the second mirroring screen is displayed to be overlapped on the content program screen.

6. The electronic device of claim 1, wherein the first execution screen of the first application is automatically executed at the first external device when the second application, executed at the second external device while the second external device is paired with the first external device, is related to the first application.

7. The electronic device of claim 1, wherein the hardware controller is further configured to:
cause the display to display an additional screen corresponding to a third external device which is paired with the first external device; and
cause audio of media content being played at the first external device to be output via the third external device,
wherein the additional screen includes a displayed control object for controlling audio output of the third external device.

8. The electronic device of claim 1, wherein the hardware controller is further configured to transmit authentication screen information to the second external device via the communication unit for displaying an authentication screen on the second external device when the first application executed on the first mirroring screen requires an authentication procedure, and
wherein the second mirroring screen includes information of the authentication procedure.

9. The electronic device of claim 8, wherein the second mirroring screen includes authenticating fingerprint information or authenticating handwriting input information received via the second external device.

10. The electronic device of claim 1, wherein the hardware controller is further configured to cause the display to display at least one recommended application associated with the first application being executed at the first external device when the mirroring connection request is received and the first application is not installed at the second external device.

11. The electronic device of claim 1, wherein the hardware controller is further configured to cause the display to display at least one recommended application stored in the first external device when the mirroring connection request is received while the second application is being executed, wherein the second application is executed according to a gesture input received via the second external device, the at least one recommended application is controllable with gesture inputs, and one of the at least one recommended application is executed at the first external device in response to a selection.

12. The electronic device of claim 1, wherein the hardware controller is further configured to receive the mirroring connection request from the first external device while the first external device is paired with the electronic device via the communication unit.

13. A method for controlling an electronic device, the method comprising:
- receiving a mirroring connection request from a first external device via a communication unit of the electronic device;
- receiving first screen data of the first external device via the communication unit;
- receiving second screen data, from the first external device via the communication unit, of a second external device paired with the first external device;
- causing a display of the electronic device to display a first mirroring screen in a first region corresponding to the first screen data and a third region, the third region displaying one or more objects corresponding to at least one candidate external device having a pairing history with the first external device, when a mirroring connection request is received from the first external device via the communication unit, wherein the first mirroring screen includes a first execution screen of a first application executed at the first external device and wherein an object to be selected from the one or more objects is activated or deactivated based on a current pairing connection status of its corresponding candidate external device with the first external device;
- receive a user input from a user input interface unit of the electronic device for selecting a displayed object corresponding to the second external device, wherein the displayed object is selected from the one or more objects displayed in the third region corresponding to the at least one candidate external device having the pairing history with the first external device; and
- in response to receiving, from the user input interface unit, the user input for selecting the displayed object corresponding to the second external device, cause the display to display a second mirroring screen in a second region corresponding to the second screen data simultaneously with the first mirroring screen displayed in the first region, wherein the second mirroring screen includes a second execution screen of a second application executed at the second external device in connection with the first application.

14. The method of claim 13, wherein the mirroring connection request is received from the first external device while the first external device is paired with the electronic device.

15. The method of claim 13, wherein the first execution screen and the second execution screen correspond to a same application or are execution screens of related applications.

* * * * *